(12) United States Patent
Fritz et al.

(10) Patent No.: US 12,542,014 B2
(45) Date of Patent: Feb. 3, 2026

(54) PLAUSIBILITY CHECK

(71) Applicant: Wirtgen GmbH, Windhagen (DE)

(72) Inventors: Matthias Fritz, Hennef (DE); René Müller, Vettelschoß (DE); Manuel Rossa, Aachen (DE)

(73) Assignee: Wirtgen GmbH, Windhagen (DE)

( * ) Notice: Subject to any disclaimer, the term of this patent is extended or adjusted under 35 U.S.C. 154(b) by 4 days.

(21) Appl. No.: 18/747,819

(22) Filed: Jun. 19, 2024

(65) Prior Publication Data
US 2025/0391210 A1     Dec. 25, 2025

(51) Int. Cl.
  *G07C 5/08*     (2006.01)
  *G01C 9/02*     (2006.01)

(52) U.S. Cl.
  CPC ............. *G07C 5/0808* (2013.01); *G01C 9/02* (2013.01)

(58) Field of Classification Search
  CPC ................................ G07C 5/0808; G01C 9/02
  See application file for complete search history.

(56) References Cited

U.S. PATENT DOCUMENTS

| | | |
|---|---|---|
| 5,327,345 A | 7/1994 | Nielsen et al. |
| 5,549,412 A | 8/1996 | Malone |
| 5,612,864 A | 3/1997 | Henderson |
| 6,371,566 B1 | 4/2002 | Haehn |
| 7,144,191 B2 | 12/2006 | Kieranen et al. |
| 7,946,788 B2 | 5/2011 | Jurasz et al. |
| 8,388,263 B2 | 3/2013 | Fritz et al. |
| 8,794,867 B2 | 8/2014 | Snoeck et al. |
| 8,961,065 B2 | 2/2015 | Snoeck et al. |
| 8,989,968 B2 | 3/2015 | Fritz et al. |
| 9,039,320 B2 | 5/2015 | Snoeck et al. |
| 9,096,977 B2 | 8/2015 | Fritz et al. |
| 9,719,217 B2 | 8/2017 | Fritz et al. |
| 9,896,810 B2 | 2/2018 | Berning et al. |
| 11,193,245 B2 | 12/2021 | Menzenbach et al. |
| 11,243,531 B2 | 2/2022 | O'Donnell |

(Continued)

FOREIGN PATENT DOCUMENTS

| | | |
|---|---|---|
| DE | 102012100934 A1 | 8/2013 |
| DE | 102017005015 A1 | 11/2018 |

(Continued)

OTHER PUBLICATIONS

Extended European Search Report for corresponding patent application No. 25179848.4. dated Nov. 18, 2025, 9 pages (not prior art).

*Primary Examiner* — Michael V Kerrigan
(74) *Attorney, Agent, or Firm* — Lucian Wayne Beavers; Patterson Intellectual Property Law PC

(57) ABSTRACT

A system is provided for determining the plausibility that a current ground surface on which a construction machine is located conforms to a prior survey of that ground surface. A controller is provided with a digital model defined within a reference system external to the construction machine. The controller determines a current relative orientation and an expected relative orientation, of at least one sensor pair of a plurality of distance sensors, relative to each other and relative to a reference plane defined in the digital model. The controller compares those orientations to confirm whether the current relative orientation conforms to the expected relative orientation.

24 Claims, 14 Drawing Sheets

(56) References Cited

U.S. PATENT DOCUMENTS

| | | | |
|---|---|---|---|
| 11,459,712 B2 | 10/2022 | Fritz | |
| 11,629,463 B2 | 4/2023 | Menzenbach et al. | |
| 11,891,763 B2 | 2/2024 | Doy et al. | |
| 2008/0152428 A1 | 6/2008 | Berning et al. | |
| 2009/0292412 A1 | 11/2009 | Han et al. | |
| 2015/0115689 A1 | 4/2015 | Snoeck et al. | |
| 2019/0387360 A1* | 12/2019 | Kean | H04W 4/023 |
| 2021/0189667 A1 | 6/2021 | Fritz | |
| 2023/0340736 A1 | 10/2023 | Fritz et al. | |

FOREIGN PATENT DOCUMENTS

| | | | |
|---|---|---|---|
| EP | 0756653 B1 | 1/1998 |
| EP | 3839146 A1 | 6/2021 |

\* cited by examiner

PLAUSIBILITY CHECK

BACKGROUND OF THE INVENTION

1. Field of the Invention

The present application relates to a construction machine having a working implement for working a ground surface and to methods of operation of such a construction machine.

2. Description of the Prior Art

The planning and implementation of a construction project to create a design surface from an existing ground surface has traditionally been performed in a series of manually controlled operations. Such a design surface may be a milled surface created in a milling operation or it may be a paved surface created in a paving operation.

In the example of a road milling project, first a survey is done of the area of the ground where the milling is to take place. This may for example be the initial survey done of an area where a road or airport or the like is to be constructed. This initial survey data set may identify a series of points on the ground surface which are identified by x, y and z co-ordinates in the local ground based reference system. Such surveys are commonly done and provided to a planning bureau or design office which may use the initial survey to plan a project. The "z" co-ordinate for each point is the actual elevation of that point in the local ground based reference system. This initial survey data set may also be referred to as an "actual ground surface data set".

The planning bureau or design office may plan the construction project and create a project design data set which includes a design surface data set that identifies the desired final elevation of the ground surface, and which identifies the project (e.g. a pavement or other structure) to be constructed on the ground surface. One part of this design work is to create a description of the desired milled surface to be created by the road milling machine. This desired surface may be identified by a design surface data set defining a series of desired milled points in the area which are again identified by x, y and z co-ordinates in the local ground based reference system. The "z" co-ordinate for each point is the desired elevation of that point in the local ground based reference system. The data sets are each typically in the form of a set of triangles, each triangle being defined by the absolute x,y,z information for the three corners defined in an external reference system independent of the milling machine. For the "actual ground surface data set" defining the existing ground surface the dimensions of the triangles are typically on the order of a few millimeters up to a few inches. For the "design surface data set" the triangles may be much larger and may be larger than the milling machine so that it is possible the milling machine will be located on a single triangle. The size of the triangles may vary within the same project, depending on the surface roughness. The rougher the surface the smaller the triangles should be in order to create the best representation of the actual surface. Scanning is a common method of surveying such an actual surface.

Prior to beginning the milling operation, a surveyor may return to the area to be milled and may locate a number of points on the original ground surface and survey those points to identify the x, y and z co-ordinates of each point in the local ground based reference system. The surveyor will then calculate, based upon the data defining the desired milled surface and the data defining the actual ground surface, the milling depth which is necessary at each point. The surveyor may physically write the desired milling depth on the ground surface adjacent the marked point, such as with a can of spray paint. The marking is typically a spray painted "X" with a spray painted number next to it indicating the desired milling depth at that location.

The milling machine operator then observes the desired milling depth written on the ground surface and adjusts the milling depth of the milling machine accordingly as the point is reached. The operator of the milling machine controls the desired milling depth at each end of the milling drum by inputting that depth, e.g., 2.0", into a grade control system, such as for example the LevelPro control system developed by Wirtgen GmbH, the assignee of the present invention. Alternatively, the operator can input desired milling depth at one end of the milling drum plus desired cross slope of the milling drum. The grade control system then maintains the selected milling depth using any of several combinations of available input sensors, typically two sensors selected from the left sideplate sensor, right sideplate sensor and gravity based cross slope sensor. Other sensors may also be used.

There have been attempts to automate parts of this process. One such attempt is that seen in Snoeck U.S. Pat. No. 8,961,065 and No. 9039320. In the Snoeck patents the actual elevation of the bottom of each end of the milling drum is determined and is then controlled based on a comparison to the design elevation for the design surface at the locations of each end of the milling drum.

There is a continuing need for improvements in such automated systems.

SUMMARY OF THE INVENTION

One problem with such automated systems is errors in the digital model used to guide the automated work of the construction machine. For the digital model to accurately guide the automated work of the construction machine the current ground surface worked by the construction machine needs to be identical to the actual ground surface described by the "actual ground surface data set" that was determined in the initial survey.

The present disclosure recognizes that there may be errors in the description of the actual ground surface by the "actual ground surface data set" that was determined in the initial survey, as compared to the current ground surface that is encountered by the construction machine at the time the work is to be done on the ground surface. Such errors may arise in several ways, including:

1. Erroneous measurements made during the initial survey;
2. Modifications made to the ground surface subsequent to the initial survey;
3. Debris such as dirt or milled material accumulating on the ground surface subsequent to the initial survey;
4. Incorrect placement of a sensor, e.g. a sensor running on the wrong surface; and
5. Malfunction of a sensor used at the time the work is done.

The present disclosure provides both methods and systems for confirming whether the current ground surface encountered by the construction machine at the time of performing the work on the ground surface is consistent with the ground surface that is expected based upon the "actual ground surface data set" that was determined in the initial survey.

Using a construction machine including a machine frame, a working implement supported from the machine frame, a controller, and a plurality of distance sensors supported directly or indirectly from the machine frame, each respective distance sensor being configured to detect a distance between the machine frame and a ground surface, such a method includes:

provoking to the controller a digital model defined within a reference system external to the construction machine, the digital model being configured to guide the construction machine as the construction machine works the ground surface to create a design surface; determining with the controller a current relative orientation, relative to each other and relative to a reference plane defined within the digital model, of a first sensor and a second sensor of at least one sensor pair of the plurality of distance sensors; determining with the controller based at least in part on the digital model an expected relative orientation, relative to each other and relative to the reference plane, of the first sensor and the second sensor of the at least one sensor pair; and comparing with the controller the current relative orientation to the expected relative orientation of the at least one sensor pair to confirm whether the current relative orientation conforms to the expected relative orientation.

The construction machine may further include at least one position data determination component operable to determine position data to define a current position of a reference point on the construction machine in the reference system external to the construction machine, and the method may further include receiving the position data with the controller and determining with the controller a current x, y position in the reference system external to the construction machine of each of the distance sensors.

As is further explained below the digital model may include two or more of several possible data sets. These data sets may include: (1) an "actual ground surface data set"; (2) a "working depth data set"; and/or (3) a "design surface data set." The "actual ground surface data set" may include x, y and z coordinate data describing the actual ground surface as surveyed at a prior time in the reference system external to the construction machine, and that "actual ground surface data set" may be updated from time to time to reflect corrections to the original data set. The "working depth data set" may include x and y coordinate data in the reference system external to the construction machine and working depth data corresponding to the x and y coordinate data. The "design surface data set" may define a design surface to be created and may include x, y and z coordinate data of the design surface in the reference system external to the construction machine. The "design surface data set" may also be prepared in a different format, for example defining a centerline of a roadway using x and y coordinate data, and then defining a width and a cross-slope of the roadway corresponding to each point along the centerline. Other formats could be used for any of the data sets, depending upon the nature of the design surface being constructed.

In one embodiment, the digital model may be a Working Depth Model including the working depth data set and the design surface data set.

In another embodiment, the digital model may be a Working Elevation Model including the actual ground surface data set and the design surface data set.

In a further embodiment, the digital model may include the actual ground surface data set and the working depth data set.

In an embodiment the reference plane of the digital model may be a horizontal reference plane defined as a reference plane perpendicular to a direction of gravity in the reference system external to the construction machine.

In an embodiment the method may further include detecting with at least one slope sensor a slope of the machine frame relative to the direction of gravity and thereby relative to the reference plane.

In an embodiment the method may further include detecting with a longitudinal slope sensor a longitudinal slope of the machine frame relative to the direction of gravity, and detecting with a cross-slope sensor a cross-slope of the machine frame relative to the direction of gravity, the cross-slope being perpendicular to the longitudinal slope.

In a method of start-up confirmation, the comparing may be performed before beginning working of the ground surface with the working implement to determine whether the current relative orientation of the at least one sensor pair is consistent with the digital model.

In a method of confirmation during working operation, the comparing may be performed during working of the ground surface with the working implement to determine whether the current relative orientation of the at least one sensor pair is consistent with coordinate data describing an expected ground surface in the reference system external to the construction machine. The expected ground surface may or may not be modified as compared to the original ground surface which was surveyed for the actual ground surface data set.

In an embodiment, in the determining of the current relative orientation and of the expected relative orientation of the at least one sensor pair, the at least one sensor pair may include a plurality of sensor pairs.

In another embodiment, the comparing may include determining whether a lack of conformity of the current relative orientation to the expected relative orientation of any of the sensor pairs is due to a change in the ground surface subsequent to preparation of the digital terrain model or due to a sensor malfunction.

In the above embodiment, the comparing may include identifying a malfunctioning sensor as a sensor present in all sensor pairs lacking conformity of the current relative orientation to the expected relative orientation for the respective sensor pair and absent from all sensor pairs having conformity of the current relative orientation to the expected relative orientation for the respective sensor pair.

In the two immediately above embodiments, if the comparing determines that the lack of conformity of the current relative orientation to the expected relative orientation of any of the sensor pairs is due to a change in the ground surface subsequent to preparation of the digital model, then the digital model may be updated to reflect the change.

In the three immediately above embodiments, if the comparing determines that the lack of conformity of the current relative orientation to the expected relative orientation of any of the sensor pairs is due to a sensor malfunction of a distance sensor being used for control of a working depth of the working implement, then the controller may automatically switch control of the working depth from the malfunctioning sensor to a different sensor.

In any of the above embodiments, the determining with the controller of the current relative orientation may include determining a difference between a current distance between the first sensor and the reference plane detected by the first sensor of the at least one sensor pair and a current distance between the second sensor and the reference plane detected by the second sensor of the at least one sensor pair, or alternatively, the determining with the controller of the current relative orientation may include determining a current angle relative to the reference plane of a line between a ground contact point of the first sensor and a ground contact point of the second sensor of the at least one sensor pair.

In another embodiment, a construction machine may include a machine frame and a working implement supported from the machine frame for working a ground surface as the machine moves across the ground surface during a working operation. A plurality of distance sensors may be supported directly or indirectly from the machine frame, each respective distance sensor being configured to detect a distance between the machine frame and the ground surface. At least one slope sensor may be configured to detect a slope of the machine frame relative to a direction of gravity. At least one position data determination component may be operable to determine position data to define a current position of a reference point on the construction machine in a reference system external to the construction machine. A controller is associated with a memory, the memory having stored therein a digital model defined within the reference system external to the construction machine, the controller being operable to receive the position data from the at least one position data determination component, wherein the controller is configured to:
  determine a current x, y position in the reference system external to the construction machine of each of the distance sensors;
  determine a current relative orientation, relative to each other and relative to a reference plane defined within the digital model, of a first sensor and a second sensor of at least one sensor pair of the plurality of distance sensors;
  determine based at least in part on the digital model an expected relative orientation, relative to each other and relative to the reference plane, of the first sensor and the second sensor of the at least one sensor pair;
  compare the current relative orientation to the expected relative orientation of the at least one sensor pair to confirm whether the current relative orientation conforms to the expected relative orientation; and
  in an event of a lack of conformity of the current relative orientation to the expected relative orientation of any of the sensor pairs, providing corrective action responsive to the lack of conformity.

In one embodiment, the digital model of the construction machine may be a Working Depth Model including a working depth data set and a design surface data set.

In another embodiment, the digital model of the construction machine may be a Working Elevation Model including an actual ground surface data set and the design surface data set.

In a further embodiment, the digital model of the construction machine may include the actual ground surface data set and the working depth data set.

In any of the above embodiments of the construction machine, the reference plane within the digital model may be a horizontal reference plane defined as a reference plane perpendicular to a direction of gravity in the reference system external to the construction machine.

In any of the above embodiments of the construction machine, the at least one slope sensor may include a longitudinal slope sensor configured to detect a longitudinal slope of the machine frame relative to the direction of gravity, and a cross-slope sensor configured to detect a cross-slope of the machine frame relative to the direction of gravity, the cross-slope being perpendicular to the longitudinal slope.

In any of the above embodiments of the construction machine, the construction machine may include a plurality of tracked ground engaging units supporting the machine frame from the ground surface and the at least one slope sensor may include a track angle sensor configured to detect a tilt angle relative to the machine frame of at least one of the tracked ground engaging units.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
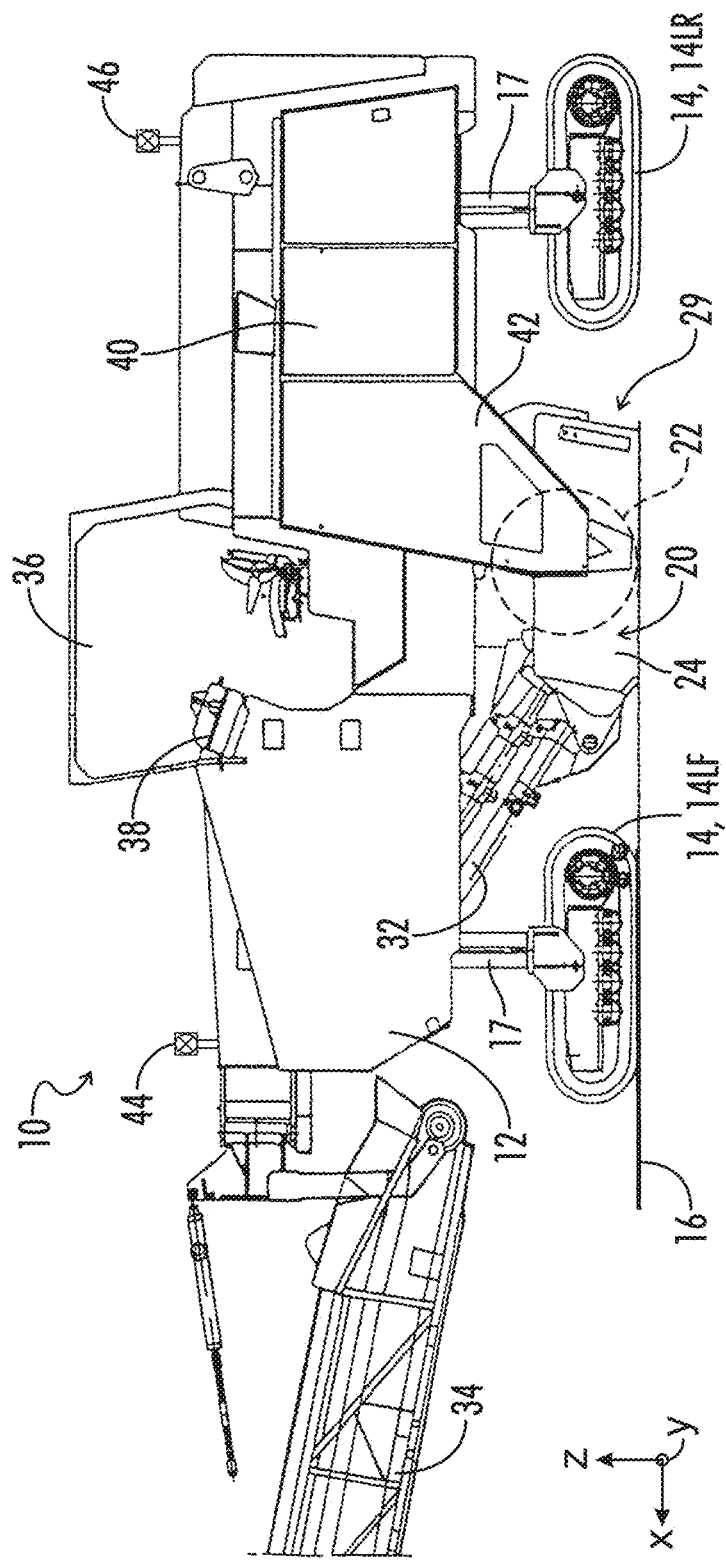
FIG. 1 is a left side elevation view of a construction machine embodied as a road milling machine incorporating the present invention.

The following disclosure describes multiple embodiments of a construction machine having a working implement for working a ground surface. In one embodiment as described with regard to FIGS. 1-12 the construction machine may be a road milling machine wherein the working implement is a milling drum. In a further embodiment described with regard to FIGS. 13-18, the construction machine may be an asphalt paving machine wherein the working implement is a paving screed. The construction machine may also be embodied as a concrete paving machine wherein the working implement is a mold of a slip form paver. The construction machine may further be embodied as a road grader wherein the working implement is a grader blade.

The present disclosure is directed to improvements in systems for the automated control of such a construction machine as it works a ground surface to create a design surface. In the case of a milling machine the design surface may be a milled surface which is created by removing material from the original ground surface. In the case of a paving machine the design surface may be a paved surface which is created by adding material on top of the original ground surface.

The present disclosure further deals with several types of digital models which are configured to guide the construction machine as the construction machine works the ground surface to create a design surface.

One such digital model which may be referred to herein as a Working Depth Model, is described in detail herein and was originally disclosed in U.S. patent application Ser. No. 17/725,640 filed Apr. 21, 2022, as described in U.S. Patent Publ. No. 2023/0340736, which is incorporated herein by reference. A Working Depth Model may include a "working depth data set" and a "design surface data set." A "working depth data set" includes x and y coordinate data in the reference system external to the construction machine and includes desired working depth data corresponding to the x and y coordinate data. A "design surface data set" defines the design surface to be created and includes x, y and z coordinate data of the design surface in the reference system external to the construction machine.

Another such digital model which may be referred to herein as a Working Elevation Model is that seen in Snoeck U.S. Pat. Nos. 8,961,065 and 9,039,320. In the Snoeck patents the actual elevation of the bottom of each end of the milling drum is determined and is then controlled based on a comparison to the design elevation for the design surface at the locations of each end of the milling drum. Such a Working Elevation Model may include an "actual ground surface data set" and a "design surface data set." The "actual ground surface data set" includes x, y and z coordinate data describing the actual ground surface as surveyed at a prior time in the reference system external to the construction machine.

A third such digital model may include an "actual ground surface data set" and a "working depth data set."

The external reference system external to the construction machine may for example be a satellite-based system such as the Global Positioning System (GPS) or Global Navigation Satellite System (GNSS). Other external references systems may include a laser-based Robotic Total Station.

When using one of the satellite-based systems, it is known that while the x and y position data from such systems may be very accurate in locating a horizontal position on the earth, the "z" or vertical position data is not as accurate as the "x" and "y" position data. For that reason, the digital models described herein may directly measure vertical position by reference to an existing ground surface which has been previously surveyed to determine a more accurate vertical position.

The following description of FIGS. 1-18 describes the use of a Working Depth Model to guide the construction machine in its creation of a design surface.

The Working Depth Model of FIGS. 1-18:

Referring now to the drawings, and particularly to FIG. 1, a construction machine in the form of a road milling machine is shown and generally designated by the number 10. The machine 10 includes a machine frame 12. A plurality of ground engaging units 14, shown in the form of tracks support the machine 10 from a ground surface 16. Wheeled ground engaging units may also be used. The ground engaging units 14 include two front ground engaging units 14LF, 14RF and two rear ground engaging units 14LR, 14RR. A plurality of lifting columns 17 support the machine frame 12 in a height adjustable manner from the ground engaging units 14.

A milling drum housing 20 is supported from the machine frame 12. A rotatable milling drum 22 is at least partially received by the milling drum housing 20 and is also supported from the machine frame 12. Thus, a height of the machine frame 12 and the milling drum 22 relative to the ground surface 16 are adjustable by adjusting an extension of the lifting columns 17. On its left and right sides, the milling drum housing 20 is closed by left and right adjustable height sideplates 24 and 26 located adjacent left and right ends 28 and 30 of milling drum 22. A height adjustable scraper blade 29 may close a rear of the milling drum housing 20.

The earth working machine 10 shown in FIG. 1 is of the type generally referred to as a large front loading milling machine, which also includes first and second conveyor sections 32 and 34 for conveying milled material away from the milling drum 22. An operator's station 36 may be carried on the machine frame 12 and a control panel 38 may be located at the operator's station 36. A main engine 40, which may be in the form of a diesel internal combustion engine, or any other suitable power source is located behind the operator's station 36. A direct belt drive arrangement (not shown) may connect the engine 40 to the milling drum 22 in a known manner. The direct belt drive arrangement may be located in a belt housing portion 42.

Figure 10:
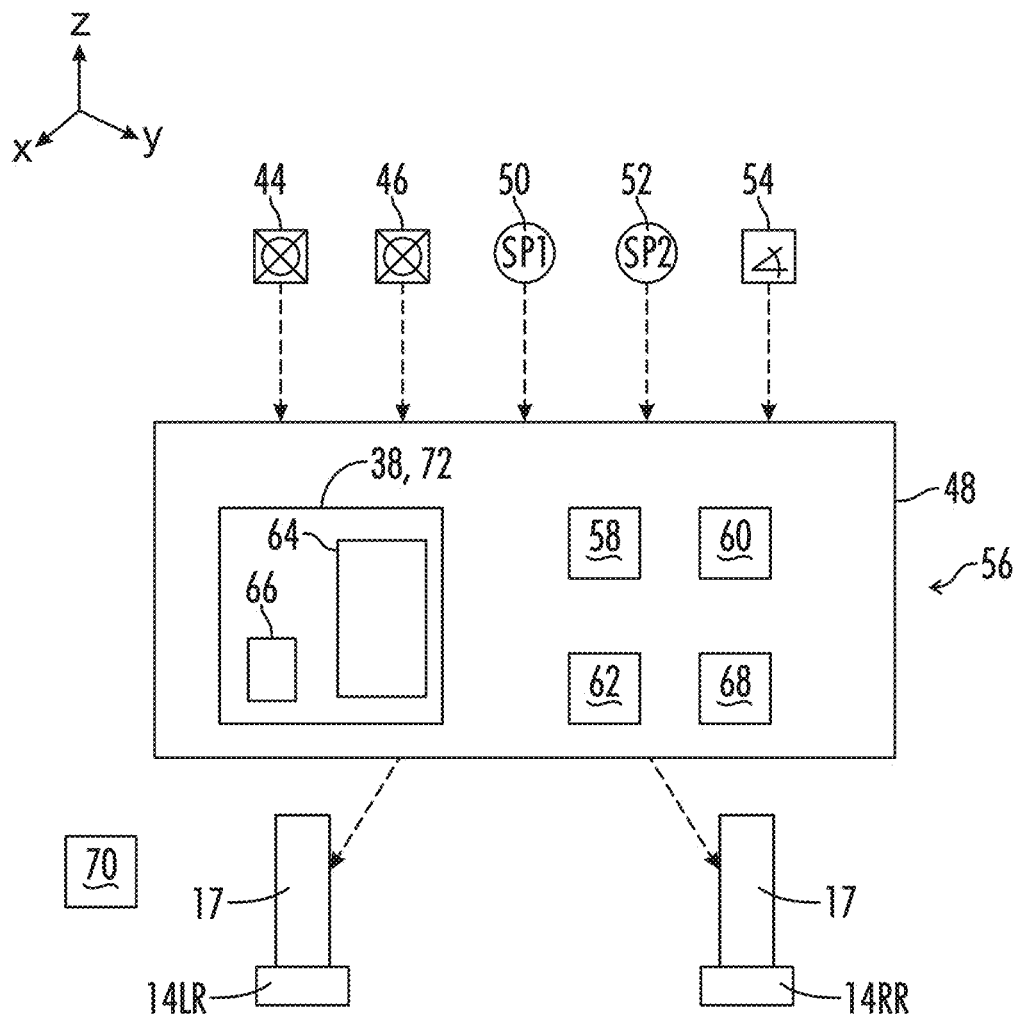
FIG. 10 is a schematic illustration of the controller with associated sensor inputs and control outputs in the embodiment of the milling machine of FIGS. 1-9.

The construction machine 10 may carry at least one position data determination component 44 and 46, supported from the machine frame 12 and operable to determine position data to define a current position of a reference point on the machine in a reference system external to the construction machine. In one embodiment the at least one position data determination component includes at least two position data determination components 44 and 46 in the form of Global Navigation Satellite System sensors, for example GPS sensors. In another embodiment the position data determination components 44 and 46 may be reflectors configured for use with a laser based Robotic Total Station. By including at least two such position data determination components the position of the locations of the two position data determination components allow the corresponding positions of all points on the machine 10 to be determined. The x, y and z components of such a reference system external to the milling machine are schematically represented in FIGS. 1 and 10. The x, y positions may represent positions in a horizontal plane and the z position may represent vertical positions relative to the horizontal plane. In FIG. 1 the x direction happens to be shown as corresponding to the forward direction of the milling machine but that is purely coincidental and is in no way required.

Controller:

Position signals from the sensors 44 and 46 may be received in a controller 48 of the construction machine 10 as schematically shown in FIG. 10. The controller 48 is described here in the context of its usage with the road milling machine 10 to control a milling depth of the milling drum during a milling operation. This can more generally be referred to as controlling a working depth of a working implement during a working operation, and it will be understood that it is also applicable to the embodiment of an asphalt paving machine described below with reference to FIGS. 13-18 in which the controller controls a paving depth, i.e. paving thickness, of a paving screed during a paving operation.

The controller 48 may also receive signals from height sensors 50 and 52 associated with the left and right sideplates 24 and 26, respectively, which signals correspond to actual milling depths of the left and right ends 28 and 30, respectively. The height sensors 50 and 52 may for example be integral to hydraulic smart cylinders which support the sideplates 24 and 26 relative to the machine frame 12.

Controller 48 may also receive a signal from a gravity based slope sensor 54 indicative of a cross-slope of the machine frame 12. As is further explained below the controller 48 may send command signals to the left and right lifting columns, for example the left and right rear lifting columns 17 to adjust the actual milling depths of the left and right ends 28 and 30 of the milling drum 22.

As schematically illustrated in FIG. 10, the construction machine 10 includes a control system 56 including the controller 48. The controller 48 may be part of the machine control system of the construction machine 10, or it may be a separate control module. The controller 48 may for example be mounted in the control panel 38 located at the operator's station 36. The controller 48 is configured to receive input signals from the various sensors, such as the sensors 44, 46, 50, 52 and 54 already described. The signals transmitted from the various sensors to the controller 48 are schematically indicated in FIG. 10 by lines connecting the sensors to the controller with an arrowhead indicating the flow of the signal from the sensor to the controller 48.

Similarly, the controller 48 will generate control signals for controlling the operation of the various actuators such as the lifting columns 17 associated with rear ground engaging units 14LR and 14RR, which control signals are indicated schematically in FIG. 10 by lines connecting the controller 48 to graphic depictions of the various actuators with the arrow indicating the flow of the command signal from the controller 48 to the respective actuators. It will be understood that for control of a hydraulic cylinder type actuator the controller 48 may send an electrical signal to an electro/mechanical control valve (not shown) which controls flow of hydraulic fluid to and from the hydraulic cylinder.

Controller 48 includes or may be associated with a processor 58, a computer readable medium 60, a data base 62 and an input/output module or control panel 38 having a display 64. An input/output device 66, such as a keyboard, joystick or other user interface, is provided so that the human operator may input instructions to the controller. It is understood that the controller 48 described herein may be a single controller having all of the described functionality, or it may include multiple controllers wherein the described functionality is distributed among the multiple controllers.

Various operations, steps or algorithms as described in connection with the controller 48 can be embodied directly in hardware, in a computer program product 68 such as a software module executed by the processor 58, or in a combination of the two. The computer program product 68 can reside in RAM memory, flash memory, ROM memory, EPROM memory, EEPROM memory, registers, hard disk, a removable disk, or any other form of computer-readable medium 60 known in the art. An exemplary computer-readable medium 60 can be coupled to the processor 58 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Figure 11:
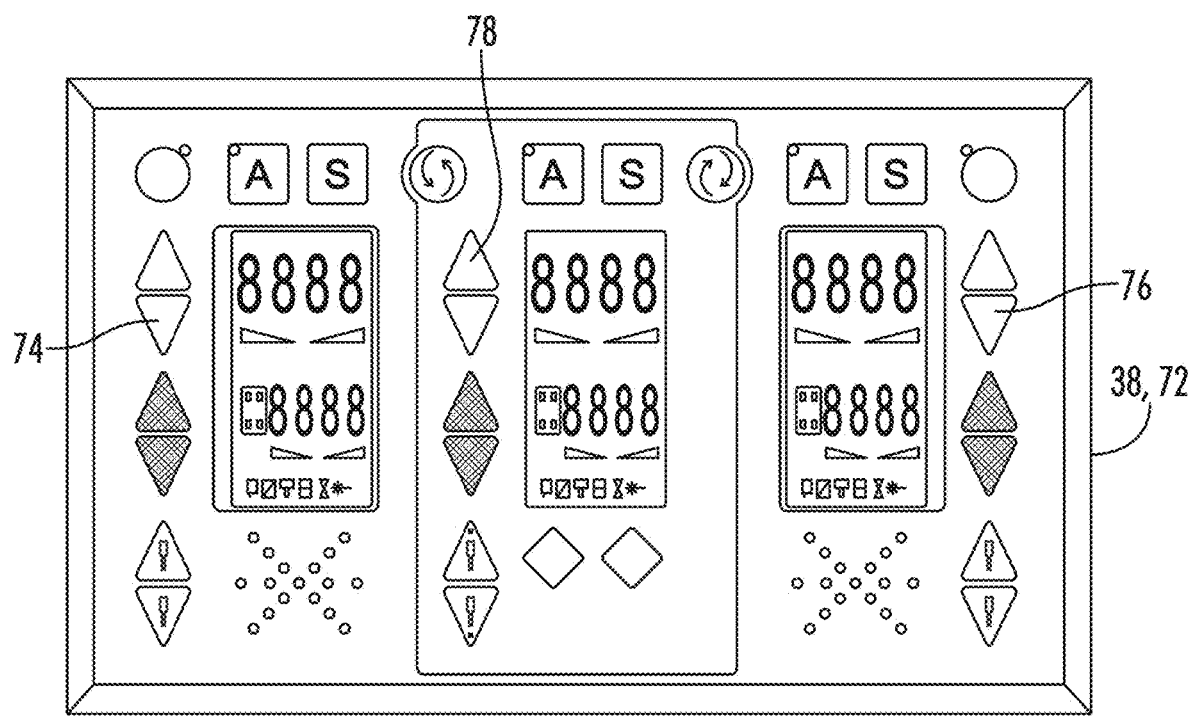
FIG. 11 is a schematic illustration of a control panel of the controller associated with the grade control system of the milling machine.

The control panel 38 may for example include a control panel as schematically shown in FIG. 11 of a grade control system 72 of the milling machine 10. The grade control system 72 may for example be a LevelPro grade control system as developed by Wirtgen GmbH, the assignee of the present application. A further description of such a grade control system 72 is found in U.S. Pat. No. 7,946,788 the details of which are incorporated herein by reference. The operator of the milling machine may control the desired milling depth at each end 28 and/or 30 of the milling drum 22 by inputting that depth, e.g., 2.0", into the grade control system 72. Alternatively, the operator can input desired milling depth at one end of the milling drum plus desired cross slope of the milling drum. FIG. 11 shows a control panel 38 by means of which a human operator may input set values for the milling depths of the ends of the milling drum and/or the cross-slope angle of the milling drum. As is further explained in U.S. Pat. No. 7,946,788 the center input device 78 can be formatted for the input of either the cross-slope or the left side or right side milling depth. The left side input device 74 can be formatted to input either the left side milling depth or the cross-slope. The right side input device 76 can be formatted to input either the right side milling depth or the cross-slope. As further described below the present invention may automatically generate those inputs of desired milling depth and/or cross-slope and input those values into the grade control system 72. The grade control system 72 then maintains the selected milling depth using any of several combinations of available input sensors, typically two sensors selected from the left sideplate sensor 50, right sideplate sensor 52 and gravity based cross slope sensor 54.

Building a Working Depth Digital Model:

When a road milling or other construction project is planned a survey may be done of the area of the ground where the milling is to take place. This may for example be the initial survey done of an area where a road or airport or the like is to be constructed. This initial survey data set may identify a series of points on the ground surface 16 which are identified by x, y and z co-ordinates in the local ground based reference system. Such surveys may be provided to a planning bureau or design office which may use the initial survey to plan a project. The "z" co-ordinate for each point is the actual elevation of that point in the local ground based reference system.

The planning bureau or design office may plan the construction project and create a project design data set which includes a design surface data set that identifies the desired final elevation of the ground surface, and which identifies the project (e.g. a pavement or other structure) to be constructed on the ground surface. One part of this design work is to create a description of the desired milled surface to be created by the road milling machine. This desired surface may be identified by a design surface data set defining a series of desired milled points in the area which are again identified by x, y and z co-ordinates in the local ground based reference system. The "z" co-ordinate for each point is the desired elevation of that point in the local ground based reference system. The databases are each typically in the form of a set of triangles, each triangle being defined by the absolute x,y,z information for the three corners defined in an external reference system independent of the milling machine. For the "actual ground surface data set" defining the existing ground surface the dimensions of the triangles are typically on the order of a few millimeters up to a few inches. For the "design surface data set" the triangles may be much larger and may be larger than the milling machine so that it is possible the milling machine will be located on a single triangle.

In one embodiment a milling depth data set of x, y and milling depth data may be created. The milling depth data set may be prepared with a separate processor 70 schematically shown in FIG. 10 (i.e. not the processor 58 located on the milling machine 10) and may be prepared prior to the loading of the milling depth data set on the controller 48 of the milling machine 10. The milling depth data set is not created in real time during the milling operation.

Thus, for example, the planning bureau which creates the design surface data set describing the desired milled surface, may create the milling depth data set by a comparison of the initial survey data set (the "actual ground surface data set") with the design surface data set describing the desired milled surface. Similarly, the milling depth data set may be created on or near the jobsite, by a comparison of the initial survey data set with the design surface data set describing the desired milled surface 82. It is also noted that the milling depth data set may be updated during a milling operation. For example, it may be decided to perform a desired milling operation in two cuts rather than one. Thus, if the initial milling depth is 4 cm at a particular x, y location, it might be desired to do that it two passes of about 2 cm each. A first pass may be made at a first milling depth less than 4 cm. The controller may then update the milling depth data set by subtracting the depth of the initial cut from the initial milling depth. Then on a second pass the updated milling depth data set will be used to control the cut to the final total desired milling depth.

Similarly, the planning bureau may create a paving depth data set to describe a layer of paving to be created on the ground surface to create a final paved ground surface. The layer of paving may for example be placed upon a previously milled surface. So in a first instance there may be a design surface data set defining a milled surface to be created, and in a second instance there may be a second design surface data set describing a paved surface to be created on top of the milled surface. The paving depth data set may be in the form of x, y and paving depth data.

It will be appreciated that the local ground based coordinate system in which the initial survey and the design surface data set are created may not be the same coordinate system as the Global Navigation Satellite System in which the sensors 44 and 46 operate, but the correlations of the positions in the local ground based coordinate system relative to positions in the Global Navigation Satellite System are known and the one or the other data sets may be converted as necessary for comparison to signals in the selected reference system of the sensors 44 and 46 being used.

The working depth digital model including the milling depth data set and the design surface data set may then be loaded into the memory 60 of the controller 48 on the milling machine 10. The milling depth data set and the design surface data set may be loaded onto the memory 60 of the milling machine 10 by wireless connection. Alternatively, the milling depth data set and the design surface data set may be loaded onto the memory 60 of the milling machine 10 by placing the same on a portable data storage device such as a memory stick or the like and then transferring the data from the portable data storage device to the memory 60 of the milling machine 10. This may be described as providing the milling depth data set and the design surface data set to the controller 48. As used herein "providing" a data set to the controller 48 includes in any way making the data set accessible by the controller 48, and it is not necessary that the data set be stored in a memory integral to the controller.

It is not necessary to provide the initial survey data set (the "actual ground surface data set") to the controller 48 of the milling machine 10.

In one embodiment the separate processor 70 may be associated with an online portal created as a service to owner/operators of the milling machine 10. The machine owner/operator and/or a surveyor and/or planning bureau working with the machine owner may upload their survey data set (the "actual ground surface data set") and design surface data set to the online portal. Then the separate processor 70 may create the milling depth data set and format the milling depth data set and the design surface data set for use with the milling machine 10. When the owner/operator of the milling machine 10 is ready to perform the milling operation the milling depth data set and the design surface data set may be wirelessly downloaded from the separate processor 70 of the online portal to the controller 48 of the milling machine 10.

The road milling machine 10 may then perform a ground milling operation as schematically illustrated in FIGS. 2-5. The road milling machine may be equipped with the GPS or other GNSS sensors 44 and 46 onboard the milling machine 10 that are used to determine the milling machine location as it moves across the ground surface 16. More particularly the GNSS system may determine the x,y position of each end 28 and 30 of the milling drum 22 in a reference system external to the milling machine 10, for example in the global positioning coordinates of the GPS system. Those x, y positions of the ends 28 and 30 of milling drum 22 may be correlated to the x, y positions of the milling depth data set and the design surface data set. Based upon the x, y positions of the ends 28 and 30 of milling drum 22 detected by sensors 44 and 46 the controller 48 may determine desired milling depths at each end of the milling drum and the desired cross slope as follows and may feed those input values to the grade control system 72 of the milling machine 10.

Based upon the x, y position of the left end 28 of the milling drum 22 the controller 48 may look up the desired milling depth at that location in the (x, y, milling depth) data set, and may feed that value to the left side milling depth input 74 of the grade control system 72.

Based upon the x, y position of the right end 30 of the milling drum 22 the controller 48 may look up the desired milling depth at that location in the (x, y, milling depth) database, and may feed that value to the right side milling depth input 78 of the grade control system 72.

Based upon the x, y positions of the left and right ends 28 and 30 of the milling drum 22, and optionally at least one point between the left and right ends, the controller 48 may look up the design elevation at each of those points in the design surface database and determine a design cross slope and may feed that value to the cross slope input 76 of the grade control system 72. The desired cross-slope for any given location of the milling drum 22 corresponding to any given x, y positions of the left and right ends 28 and 30 of the milling drum 22 may be determined in several ways as further described below with reference to FIGS. 6-9.

Figure 3:
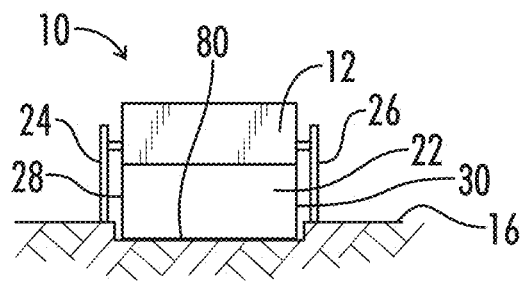
FIG. 3 is a schematic rear elevation view of the machine of FIG. 2 when performing a first pass milling operation.
Figure 4:
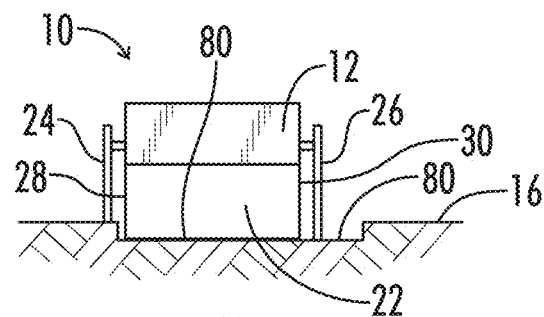
FIG. 4 is a schematic rear elevation view of the machine of FIG. 3 when performing a second pass milling operation adjacent the first pass milling operation.
Figure 5:
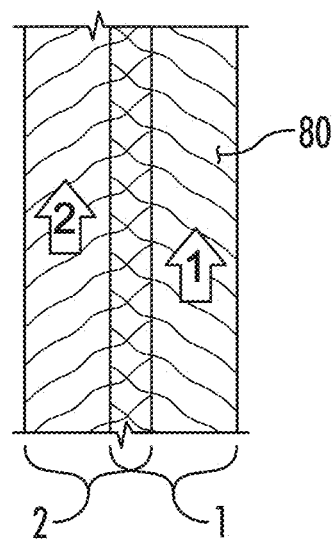
FIG. 5 is a schematic plan view of the ground surface having been milled in both a first pass and a second pass milling operation.

FIG. 5 schematically shows a plan view of both a "first pass" milling operation and an overlapping "second pass" milling operation. The "first pass" is indicated by the shaded area with a "1" in an arrow. The "second pass" is indicated by a shaded area with a "2" in an arrow. FIG. 3 is a schematic rear elevation cross-section view showing the milling machine 10 during the "first pass". FIG. 4 is a schematic rear elevation cross-section view showing the milling machine 10 during the "second pass".

On a typical "first pass" milling operation as represented in FIG. 3 the milling machine 10 may begin on the uncut actual surface 16 with both sideplates 24 and 26 resting on the uncut surface 16. First the operator of the milling machine may "zero" the grade control system 72. This is accomplished by lowering the machine frame 12 and the milling drum 22 until the milling drum 22 first touches the surface 16 to be milled. This setting of the extension of the lifting columns 17 and this position of the sideplates 24 and 26 is set as "zero" milling depth.

The grade control system 72 then does the actual milling depth control to that desired milling depth using any one of many possible combinations of sensor inputs. For example the grade control system 72 may use the two sideplate sensors 50 and 52, or the grade control system 72 may use the cross-slope sensor 54 and one of the sideplate sensors 50 or 52. Other grade sensors such as ultrasonic or laser sensors (not shown) may also be used if available.

After such a "first pass" milling operation as seen in FIG. 3 the milling machine 10 may be operated in a "second pass" mode as seen in FIG. 4 wherein there is no control to any quantified milling depth. In a typical "second pass" milling operation the right sideplate 26 is allowed to run on the previously cut surface 80 of the "first pass" and the milling depth of the right end of the milling drum is set to zero to match the previously cut surface 80. The grade control system 72 may then use the gravity based cross slope sensor 54 to control the actual cross slope to the desired cross slope.

Determination of Desired Cross-Slope:

For any given x, y positions of the two ends 28 and 30 of the milling drum 22 the desired cross-slope angle for the milling drum 22 can be determined by knowing the design surface elevation at those two positions, so long as the design surface is planar between those two positions. There is the possibility, however, that the design surface might have a "crown", a shoulder or other discontinuity between those two positions in which case a cross-slope determined only by comparing those two end positions might be in error. This problem can be solved by including in the cross-slope analysis at least one intermediate point between the two ends 28 and 30. This intermediate point may for example be a mid-point between the two ends. This procedure is schematically illustrated in FIGS. 6-9.

Figure 12:
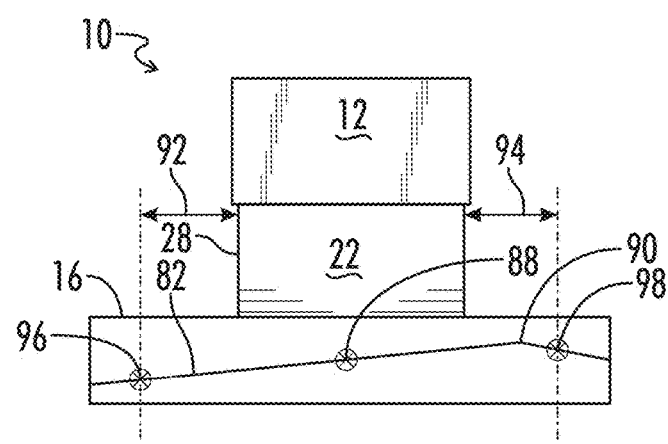
FIG. 12 is a further schematic illustration similar to FIGS. 6-9 but illustrating a technique for identifying a discontinuity in the design surface closely adjacent a planned path of the milling machine.

Furthermore, as schematically illustrated in FIG. 12, it is possible to analyze the design elevations along the line in the x, y plane for points lying laterally outside of the ends of the milling drum in order to identify the presence of non-linearities in the design surface closely adjacent a planned path of the milling machine. This allows the machine operator to perhaps modify the planned path in order to improve milling efficiency. Also, the machine operator may choose to select a different sensor to guide the milling depth control.

Figure 6:
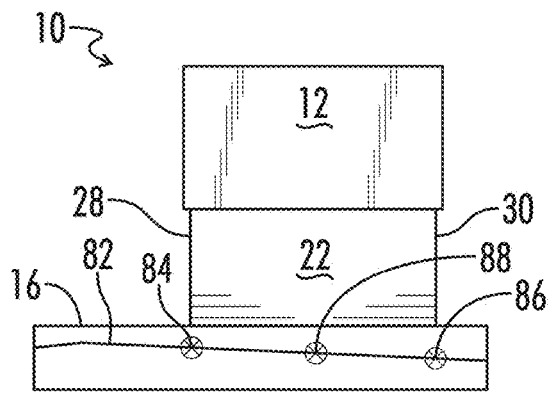
FIG. 6 is a schematic rear elevation view of the milling machine on top of a ground surface to be milled and indicating the design profile of a design surface below the ground surface. Design elevations at the current x, y positions of the left and right ends of the milling drum, and of one intermediate point of the milling drum are indicated by circled "X's". In the situation shown in FIG. 6 the design surface profile underlying the milling drum is straight and the three "X's" are aligned.

FIG. 6 schematically shows a rear elevation view of the milling machine 10 standing on the existing ground surface 16. The underlying design surface is schematically represented by 82. A point on the design surface 82 below the left end 28 of milling drum 22 is indicated by an "X" numbered 84. A point on the design surface 82 below the right end 30 of milling drum 22 is indicated by an "X" numbered 86. A point on the design surface 82 below the mid-point of milling drum 22 is indicated by an "X" numbered 88. The controller 48 is configured to compare the points 84, 86 and 88 and determine whether they lie in a straight line. If they do this indicates that there is no "crown" between the end points and the desired cross-slope is the slope of the line through the three points.

Figure 7:
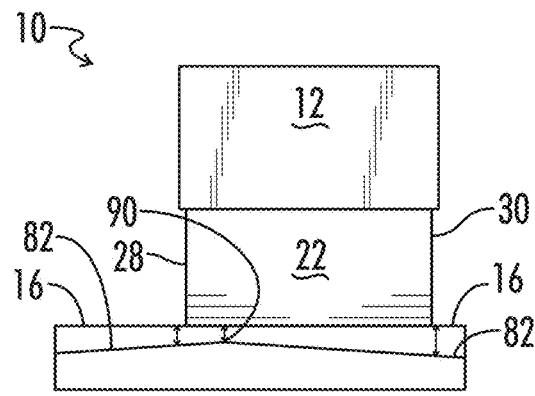
FIG. 7 is a schematic rear elevation view of the milling machine on top of a ground surface to be milled and indicating the design profile of a design surface below the ground surface. In the situation shown in FIG. 7 the design surface profile underlying the milling drum includes a crown.
Figure 8:
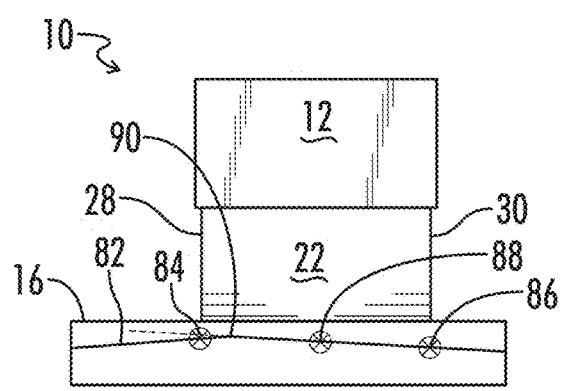
FIG. 8 is a view in the situation of FIG. 7 in which the design elevations at the current x, y positions of the left and right ends of the milling drum, and of one intermediate point of the milling drum are indicated by circled "X's". In the situation shown in FIG. 8 wherein the design surface profile underlying the milling drum includes the crown, the three "X's" are not aligned.
Figure 9:
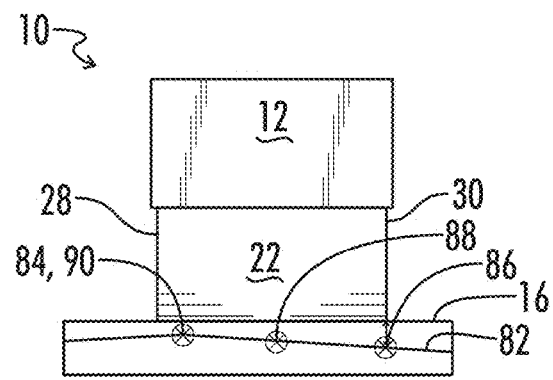
FIG. 9 is a view similar to FIG. 8, showing the location of the crown with a further circled "X" which now aligns with the "X" for the intermediate point and the "X" for the right end of the milling drum.

FIG. 7 schematically shows a rear elevation view of the milling machine standing on the ground surface, but this time standing over a portion of the design surface 82 including a crown 90. FIG. 8 schematically illustrates the comparison by the controller 48 of these three points, which the controller 48 will determine do not lie on a straight line. Once the controller 48 determines that the three points do not lie on a straight line, the next step is to determine the location of the crown 90. This can be done by examining intermediate points inward from one of the outer points 84 and 86 until a design elevation is found that aligns with the other end point and the intermediate point 88. FIG. 9 illustrates this process wherein the left point 84 has been moved inward until it is located at the crown point 90 at which point the three points 84, 86 and 88 are found to be in a straight line. For the example seen in FIG. 9 the desired cross-slope is determined to be the slope of the line through the three points 84, 86 and 88.

It is of course also possible that the controller 48 could be configured to choose the slope to the left side of the crown 90 as the design slope. In situations like that of FIGS. 7-9 the controller may be configured to choose the desired cross-slope as the slope of the longest length underlying the milling drum 22, which in the example of FIG. 9 is the slope on the right side of the crown 90. The controller 48 may also be configured to choose one of the slopes that is contiguous with a previously milled portion, or the controller 48 may be configured such that the slope of the right or left of the crown 90 can be selected by the operator.

FIG. 12 schematically illustrates the further alternative of examining the design elevation of points lying along the line defined by the x, y positions of the two ends of the milling drum but lying laterally outside of the length of the milling drum 22. In the illustrated embodiment the controller may be configured to examine the design milling depth elevations along a line extending between an x, y position laterally spaced a distance 92 to the left of the milling drum 22 and an x, y position laterally spaced a distance 94 to the right of the milling machine 22. The distances 92 and 94 may for example be within a range of from 0 to 3 meters. The design surface elevations 96 and 98 at those x, y positions may be compared with the design surface elevation 88 at the intermediate point on the milling drum 22 in a manner similar to that described above for FIGS. 7-9. In this manner the controller 48 may identify the location of the crown or other discontinuity 90 falling within the lateral distance 94 to the right of the milling drum 22. This information may be displayed to the operator and/or utilized by the controller 48 to modify the planned path of the milling machine 10 or to select a different sensor to guide the milling depth control.

Methods of Operation:

This detailed example of methods of operation is set forth in the context of the use of the road milling machine 10 to control a milling depth of the milling drum during a milling operation. As previously noted this can more generally be referred to as controlling a working depth of a working implement during a working operation, and it will be understood that it is also applicable to the embodiment of an asphalt paving machine in which the controller controls a paving depth, i.e. paving thickness, of a paving screed during a paving operation.

A method of controlling the construction machine 10 including the machine frame 12, the milling drum 22 supported from the machine frame 12, and the controller 48 configured to control the milling depth of the milling drum 22 as the machine moves across the ground surface 16, may comprise:

(a) providing to the controller 48 a milling depth data set including x and y coordinate data in a reference system external to the construction machine, and including desired milling depth data corresponding to the x and y coordinate data;

(b) providing to the controller 48 a design surface data set defining a design surface to be created, the design surface data set including x, y and z coordinate data of the design surface in the reference system external to the construction machine;

(c) performing a milling operation with the milling drum 22 as the machine 10 moves across the ground surface 16;

(d) determining a current x, y position in the reference system external to the construction machine of the first end 28 of the milling drum 22 during the milling operation;

(e) determining a current x, y position in the reference system external to the construction machine 10 of the second end 30 of the milling drum 22 during the milling operation;

(f) determining with the controller 48 from the milling depth data set a desired milling depth for the first end 28 of the milling drum 22 at the current x, y position of the first end 28 of the milling drum;

(g) determining with the controller 48 from the milling depth data set a desired milling depth for the second end 30 of the milling drum 22 at the current x, y position of the second end 30 of the milling drum 22;

(h) determining with the controller 48 from the design surface data set a desired cross-slope for the milling drum 22 at a current location of the milling drum corresponding to the current x, y positions of the first and second ends 28, 30 of the milling drum; and (i) controlling an actual milling depth of the milling drum 22 by performing at least two steps selected from the group consisting of:

(i)(1) controlling an actual milling depth of the first end 28 of the milling drum to correspond to the desired milling depth for the first end 28 at the current x, y position of the first end;

(i)(2) controlling an actual milling depth of the second end 30 of the milling drum to correspond to the desired milling depth for the second end 30 at the current x, y position of the second end; and (i)(3) controlling an actual cross-slope of the milling drum 22 to correspond to the desired cross-slope for the milling drum 22 at the current x, y positions of the first and second ends 28, 30 of the milling drum.

The method may further include determining the current x, y position in the reference system external to the construction machine 10 of at least one intermediate point on the milling drum 22 between the first and second ends of the milling drum during the milling operation. The intermediate point may be above point 88 in FIGS. 6-9. The grade control system 72 may then maintain the selected milling depth using any of several combinations of available input sensors, typically two sensors selected from the left sideplate sensor 50, right sideplate sensor 52 and gravity based cross slope sensor 54.

In the above method the step (h) may further include determining from the design surface data set the desired cross-slope for the milling drum 22 at the current x, y positions of the first and second ends 28, 30 of the milling drum 22 based upon a design elevation of the design surface 82 at the current x, y position of the at least one intermediate point 88 and based on a design elevation of the design surface at the current x, y position of one of the first and second ends as schematically shown in FIG. 9.

Alternatively, in the above method step (h) may include:
determining from the design surface data set a presence of a crown 90 in the design surface 82 between the current x, y positions of the first and second ends; and
determining the desired cross-slope for the milling drum at the current x, y positions of the first and second ends of the milling drum as a slope from the crown 90 through the design elevation corresponding to the x, y position of one of the first and second ends 28 or 30 furthest from the crown 90 as schematically shown in FIG. 9.

As a further alternative in the above method, step (h) may include determining from the design surface data set the desired cross-slope for the milling drum 22 at the current location of the milling drum 22 based upon a plurality design elevations of the design surface along a line extending through and beyond the design elevation of the design surface at the current x, y positions of the first and second ends 28 and 30 of the milling drum 22, as schematically shown and described above regarding FIG. 12. The method may further include detecting a discontinuity in the design elevation of the design surface along that line but lying laterally outside of the length of the milling drum 22, for example a shoulder of the design surface.

The methods described above may further include prior to step (a), preparing the milling depth data set by comparing the design surface data set to a survey data set including actual x, y and z coordinates of an existing ground surface 16 to be milled to create the design surface 82.

In the above methods the survey data set is preferably not provided to the controller 48.

In the above methods steps (d) and (e) may be performed using a global navigation satellite system.

In the above methods the milling operation of step (c) may be a first pass milling operation as shown in FIG. 3 in which the ground surface 16 immediately adjacent both of the first and second ends 28 and 30 of the milling drum 22 has not already been milled to the design surface 82.

The above methods may further include performing a second pass milling operation 2 as schematically illustrated in FIGS. 4 and 5. The second pass milling operation 2 may include steps of:
controlling the milling depth of the second end 30 of the milling drum 22 adjacent the milled strip 1 to match an existing elevation of the milled strip 1; and
determining from the design surface data set a desired cross-slope for the milling drum 22 at a current location of the milling drum corresponding to the current x, y positions of the first and second ends 28 and 30 of the milling drum 22 during the second pass milling operation 2 using the techniques as described above with reference to FIGS. 6-9; and
controlling an actual cross-slope of the milling drum 22 to correspond to the desired cross-slope for the milling drum at the current location of the milling drum 22 during the second pass milling operation 2.

Figure 13:
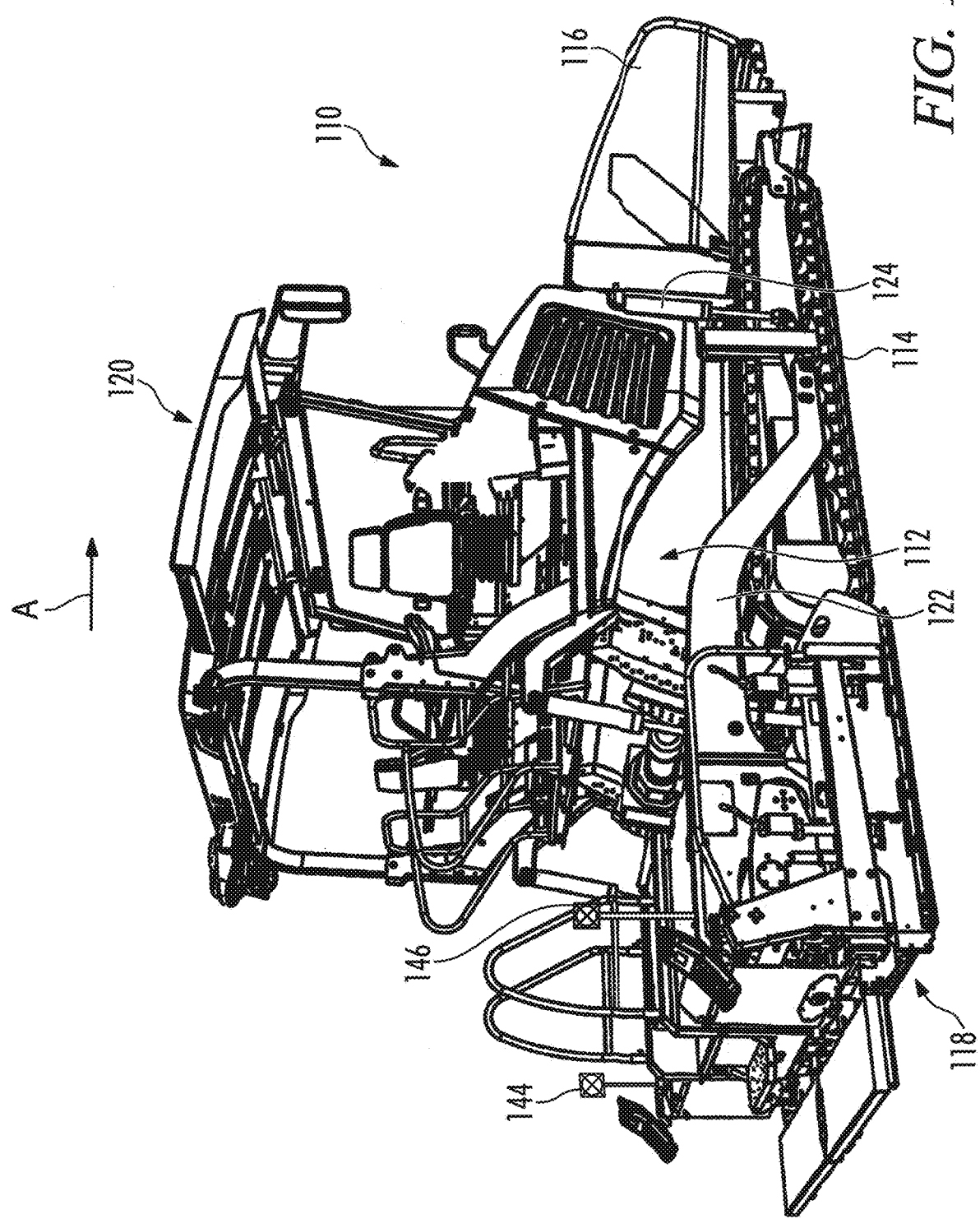
FIG. 13 is a right side perspective view of a construction machine embodied as an asphalt paving machine incorporating the present invention.

Differential Paving with an Asphalt Paving Machine:

Referring now to the drawings, and particularly to FIG. 13 a construction machine in the form of an asphalt paving machine is shown and generally designated by the number 110. The machine 110 includes a machine frame 112. A plurality of ground engaging units 114, shown in the form of tracks support the machine 110 from a ground surface. Wheeled ground engaging units may also be used.

In a front region of the machine frame 112 as seen in the working direction A, a reservoir 116 for holding the material to be laid is arranged. Located at the rear of the road paving machine 110 is a screed 118 for laying the material. The paving screed 118 may be described as a working implement 118 of the paving machine 110. The driver's platform 120 is arranged between the reservoir 116 and the screed 118.

The screed 118 may be configured as a board floating on the material to be laid. For this purpose, the screed 118 is connected to the machine frame 112 by pivot arms 122 so that the screed 118 may move up and down relative to machine frame 112 by pivoting the pivot arms 122 relative to machine frame 112. Pivot actuators 124 may be connected between the machine frame 112 and each of the pivot arms 122 to control this pivotal movement. The desired paving depth or thickness is achieved, in particular, via adjustment of the setting angle of the screed 118, which is determined by the height of a screed traction point. To adjust the screed traction point, the actuators 124 are provided on the sides of the machine frame 112. With the actuators 124, not only the setting angle of the screed 118 but also the incline or cross-slope of the screed 118 can be set transversely to the direction of finishing A.

The paving machine 110 may carry at least one position data determination component 144 and 146, operable to determine position data to define a current position of the left and right ends of the screed 118 in a reference system external to the construction machine. In the embodiment of a paving machine the position data determination components may be located on the ends of the screed 118 or on the pivot arms 122 that move with the screed 118. It is noted that in the context of a paving machine this may be preferred, as contrasted to the milling machine 10 where the position data determination components were located on the machine frame. This is because in the paving machine 110 the working implement moves up and down relative to the machine frame whereas in the milling machine 10 the working implement may be vertically fixed relative to the frame. Thus, placement of the position data determination components on or adjacent the working implement may provide a more direct measure of the position of the working implement in the case of a paving machine. But it is noted that it is also possible to place the position data determination components on the machine frame, even with a construction machine such as an asphalt paving machine wherein the working implement is movable relative to the machine frame, in which case a sensor may be used to detect that relative movement and the controller may then determine the position of the working implement relative to the machine frame.

Figure 14:
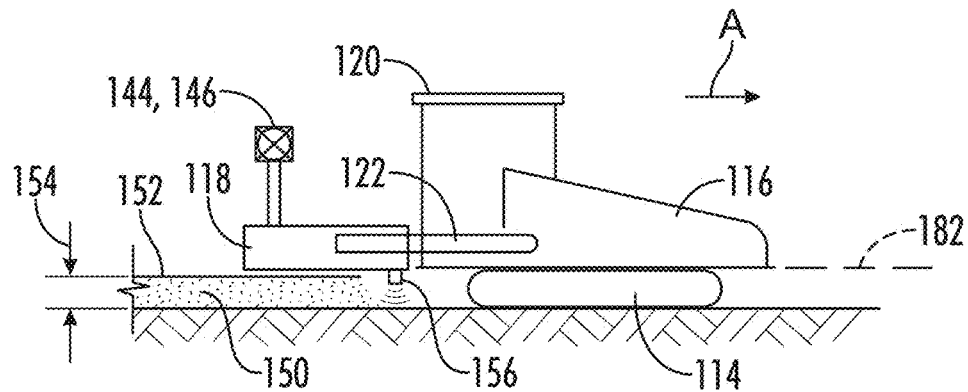
FIG. 14 is a schematic right side elevation view of the paving machine of FIG. 13 performing a paving operation.

FIGS. 14-17 illustrate, in a manner analogous to FIGS. 2-5, how the asphalt paving machine 110 performs its working operations, in this case paving operations. FIG. 14 is a right side elevation schematic view of the paving machine 110 laying down a layer of asphalt paving 150 on a ground surface 16 to form a final paved surface 152. The paved surface 152 may be the design surface planned for the project. The ground surface 16 in this instance may be a previously milled surface. The layer of asphalt paving 150 may have a thickness 154 which may be referred to as a paving depth or working depth 154.

The paving depth 154 is determined by the height of the paving screed 118 above the ground surface which may be detected for example with ultrasonic sensors such as 156 mounted on the screed 118 or on a structure attached to the screed such as the pivot arms 122. As schematically shown in FIG. 15, the screed 118 may also carry a gravity based cross-slope sensor 158 which detects the actual cross-slope from end to end of the paving screed 118.

Actual paving depth signals and actual cross-slope signals from sensors 156 and 158 may be received by a controller such as controller 48 located on the paving machine 110. The controller 48 may then generate control signals sent to the actuators 124 to raise or lower the pivot arms 122 and the ends of the screed 118 as needed to control the paving depth 154 in accordance with the paving depth data set and the design surface data set as described above. In FIGS. 14-17 the design surface for the final paved surface as defined by the design surface data set is represented by the dashed line 182.

Figure 15:
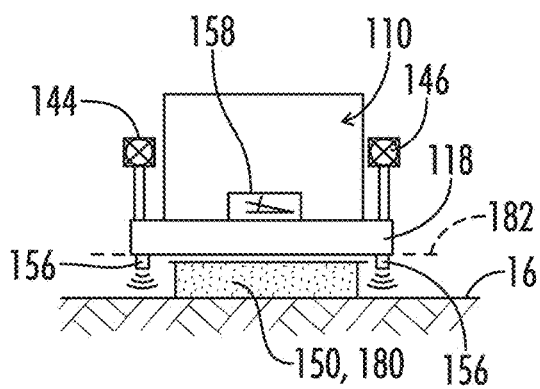
FIG. 15 is a schematic rear elevation view of the machine of FIG. 14 when performing a first pass paving operation.
Figure 16:
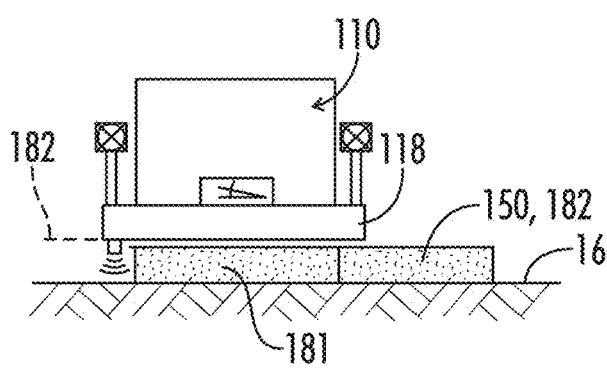
FIG. 16 is a schematic rear elevation view of the machine of FIG. 14 when performing a second pass paving operation adjacent the first pass paving operation.
Figure 17:
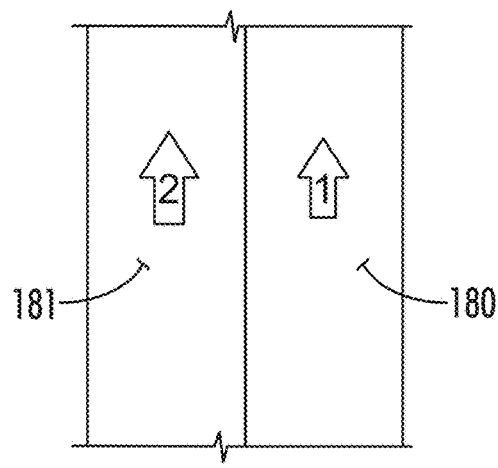
FIG. 17 is a schematic plan view of the ground surface having been paved in both a first pass and a second pass paving operation.

FIG. 15 schematically shows a rear elevation view of the paving machine 110 creating a first worked strip 180, in this case a first paved strip 180. FIG. 16 schematically shows a rear elevation view of the paving machine 110 creating a second worked strip 181 adjacent the first worked strip 180. In this case the right end depth sensor 156 is used to match the right side paving depth of the second worked strip 181 to the paving depth of the adjacent first worked strip 180. The cross-slope sensor 158 is then used to control the cross-slope of the second paved strip 181 to be equal to the desired cross-slope at those x, y locations of the screed 118 as determined from the design surface data set.

Figure 18:
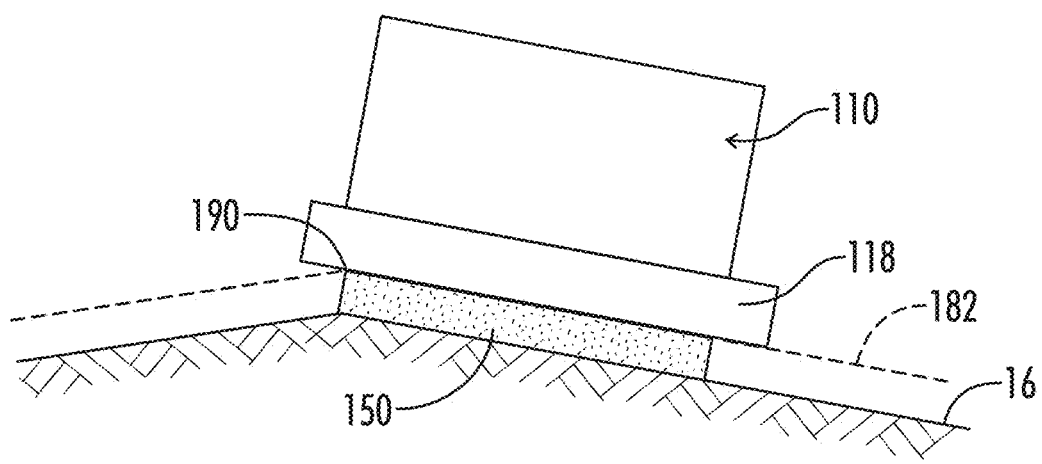
FIG. 18 is a schematic rear elevation view of the paving machine on top of a ground surface to be paved and indicating the design profile of a design paved surface to be created above the ground surface where the design surface includes a crown.

FIG. 18 illustrates an example where the design surface 182 of the asphalt paving 150 includes a discontinuity such as crown 190. The controller 48 may detect the presence of this discontinuity 190 in the same manner as discussed above for the milling machine, by examining the design elevation of the design surface along a line extending through the ends of the screed 118.

Confirming Accuracy of a Digital Model:

As noted, one problem with the use of automated systems to control a construction machine is that of errors in the digital model used to guide the automated work of the construction machine. For the digital model to accurately guide the automated work of the construction machine the current ground surface worked by the construction machine needs to be identical to the actual ground surface described by the "actual ground surface data set" that was determined in the initial survey. This is true regardless of which digital model is used, because the other data sets such as the "working depth data set" and the "design surface data set" are derived in part from the "actual ground surface data set."

There may be errors in the description of the actual ground surface by the "actual ground surface data set" that was determined in the initial survey, as compared to the current ground surface that is encountered by the construction machine at the time the work is to be done on the ground surface. Such errors may arise in several ways, including:
1. Erroneous measurements made during the initial survey;
2. Modifications made to the ground surface subsequent to the initial survey;
3. Debris such as dirt or milled material accumulating on the ground surface subsequent to the initial survey;
4. Incorrect placement of a sensor, e.g. a sensor running on the wrong surface; and
5. Malfunction of a sensor used at the time the work is done.

The present disclosure provides an automated system by which the controller may look at data from various sensors which are present on the construction machine and evaluate whether that data conforms to the data that would be expected if the current ground surface conforms to the ground surface as defined by the initial survey. If it is confirmed that the current ground surface conforms to the ground surface as defined by the initial survey the construction work may proceed with confidence. If a potential error is detected corrective action may be taken.

The sensors used to confirm that the current ground surface conforms to the ground surface as defined by the initial survey are referred to herein as "distance sensors." A distance sensor is a sensor that is configured to detect a distance between the machine frame 12 and the ground surface 16. It is not required that the distance sensor actually provide a quantitative measure of an actual distance between a point on the machine frame and the ground surface, but only that it generate a signal that is representative of such a distance taking into account known geometry of the construction machine and a known position of the sensor relative to the machine frame 12.

Figure 19:
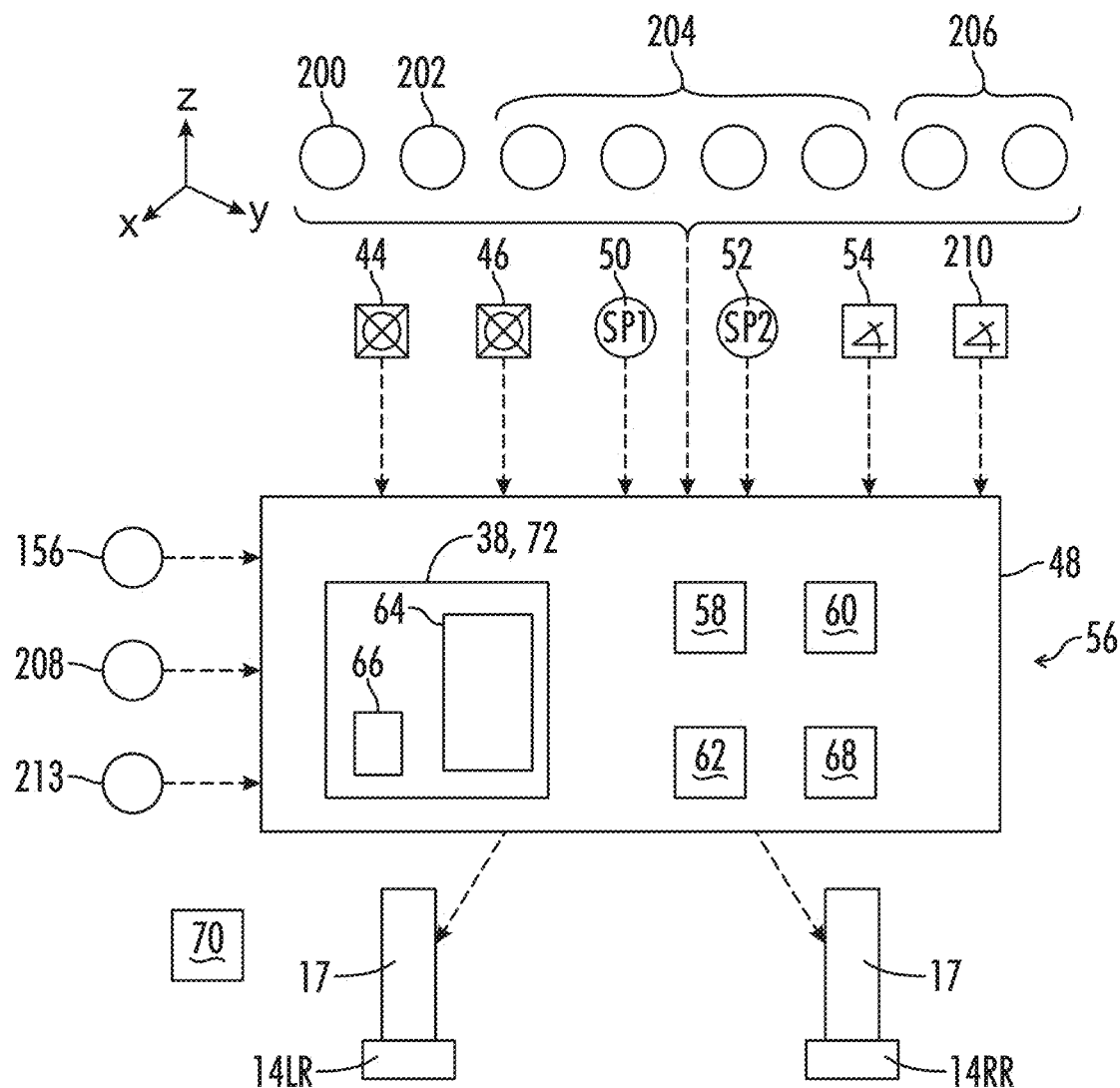
FIG. 19 is a schematic illustration of the controller with associated sensor inputs and control outputs in an embodiment configured to confirm whether the current ground surface conforms to the ground surface as previously surveyed.

FIG. 19 is a schematic representation of the control system 56, previously described with regard to FIG. 10, schematically illustrating the various position sensors that may be used on a road milling machine 10 like that of FIG. 1.

One example of such distance sensors is the sideplate sensors 50 and 52 described above.

Another example is what are often referred to as leading sensors 200 and 202, which are ground engaging distance sensors located in front of the milling drum 22 near the left and right ends of the milling drum.

Another example is leg extension sensors 204 which may be incorporated in the lifting columns 17 and which provide a signal representative of a distance between the machine frame 12 and the ground surface 16 at each of the lifting columns. These leg extension sensors may be integrated in hydraulic smart cylinders internal to each of the lifting columns. As schematically shown in FIG. 19 there may be four such leg extension sensors 204, one in each lifting column 17.

Another example of a suitable distance sensor is a scraper blade extension sensor 206 which may detect a position of the height adjustable scraper blade 29 relative to the machine frame 12. There may be two such scraper blade extension sensors 206, one near each end of the scraper blade 29. The scraper blade extension sensors 206 may also be integrated in hydraulic smart cylinders used to control the vertical position of the scraper blade 29 relative to the machine frame 12.

Figure 20:
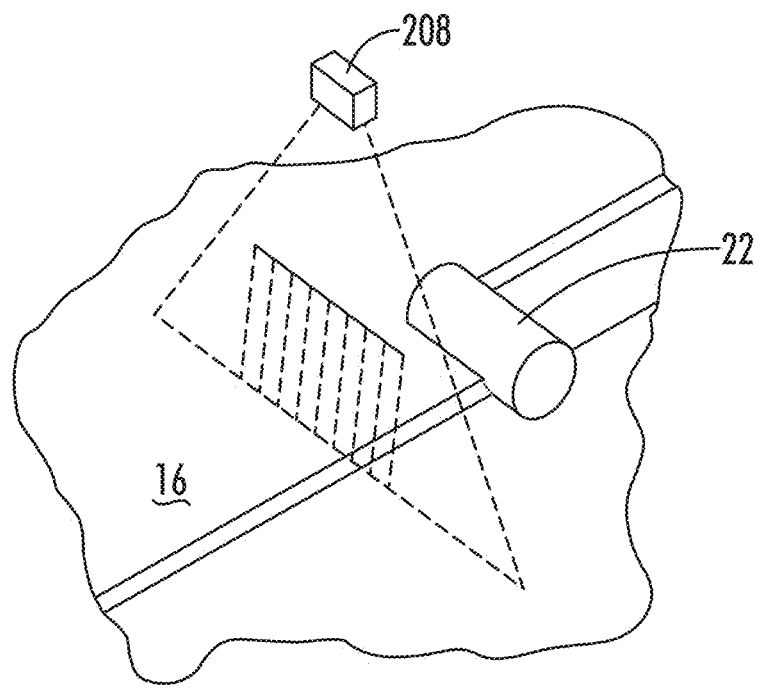
FIG. 20 is a schematic illustration of a scanner type of distance sensor.

Still another example of a suitable distance sensor may include non-contact type sensors. The ultrasonic sensors 156 like those shown on the paving machine 110 in FIGS. 14-16 may also be used with milling machines. Also, non-contact scanning techniques using a scanning sensor 208 such as that shown in FIG. 20 may be used. Such a scanning sensor 208 may be constructed in the manner further described with regard to FIG. 17 of U.S. Patent Publ. No. 2024/0084529, the details of which are incorporated herein by reference.

In addition to the use of the distance sensors described above, the techniques disclosed herein will utilize data from one or more inclination sensors that can detect the orientation of the machine frame relative a reference plane defined within the digital model in the reference system external to the construction machine 10. Such inclination sensors may include a gravity based longitudinal slope sensor 210 and the previously described gravity based cross-slope sensor 54. The longitudinal slope sensor 210 detects an inclination relative to gravity along the length of the machine frame between its front and rear. The cross slope sensor 54 detects an inclination relative to gravity across the width of the machine frame 12 between its left and right sides.

A further example of a suitable inclination sensor is a track angle sensor 213 which may detect the angle of one of the ground engaging tracks 14 relative to the lifting column 17 to which it is attached. Such tracks 14 are typically pivotally mounted to the lower end of their respective lifting columns 17 so that the tracks pivot about an axis perpendicular to the length of the lifting column 17.

The techniques disclosed herein are based on the principle that once the location (in terms of x and y coordinates) of the construction machine 10 within the reference system external to the construction machine are known, then if the ground surface on which the construction machine 10 sits has an elevation profile identical to the profile expected based upon the initial survey of the ground surface, the various extension sensors will detect predictable distances between the machine frame 12 and the ground surface 16. More particularly, any given sensor pair selected from the available distance sensors will have a predictable relative orientation to each other and relative to a reference plane 214 defined in the reference system external to the construction machine 10.

The basic steps of the technique include:
  providing to the controller 48 a digital model defined within a reference system external to the construction machine 10, the digital model being configured to guide the construction machine as the construction machine works the ground surface 16 to create a design surface 82;
  determining with the controller 48 a current relative orientation, relative to each other and relative to a reference plane 214 defined within the digital model, of a first sensor and a second sensor of at least one sensor pair of the plurality of distance sensors;
  determining with the controller 48 based at least in part on the digital model an expected relative orientation, relative to each other and relative to the reference plane 214, of the first sensor and the second sensor of the at least one sensor pair; and
  comparing with the controller 48 the current relative orientation to the expected relative orientation of the at least one sensor pair to confirm whether the current relative orientation conforms to the expected relative orientation.

Determining Current Relative Orientation:

The relative orientation of a sensor pair can only be derived if there is a known reference surface 214. This reference surface 214 can be solely defined for that purpose and there is no need for a physical representation of the reference surface. One suitable choice for a reference surface 214 is a horizontal plane (relative to gravity) since such a horizontal plane can be directly referenced by the inclination sensors discussed above. The distances measured by the distance sensors are determined relative to the machine frame 12 and the orientation of the machine frame 12 relative to the reference plane is determined with the inclination sensors 210 and 54.

Figure 21A:
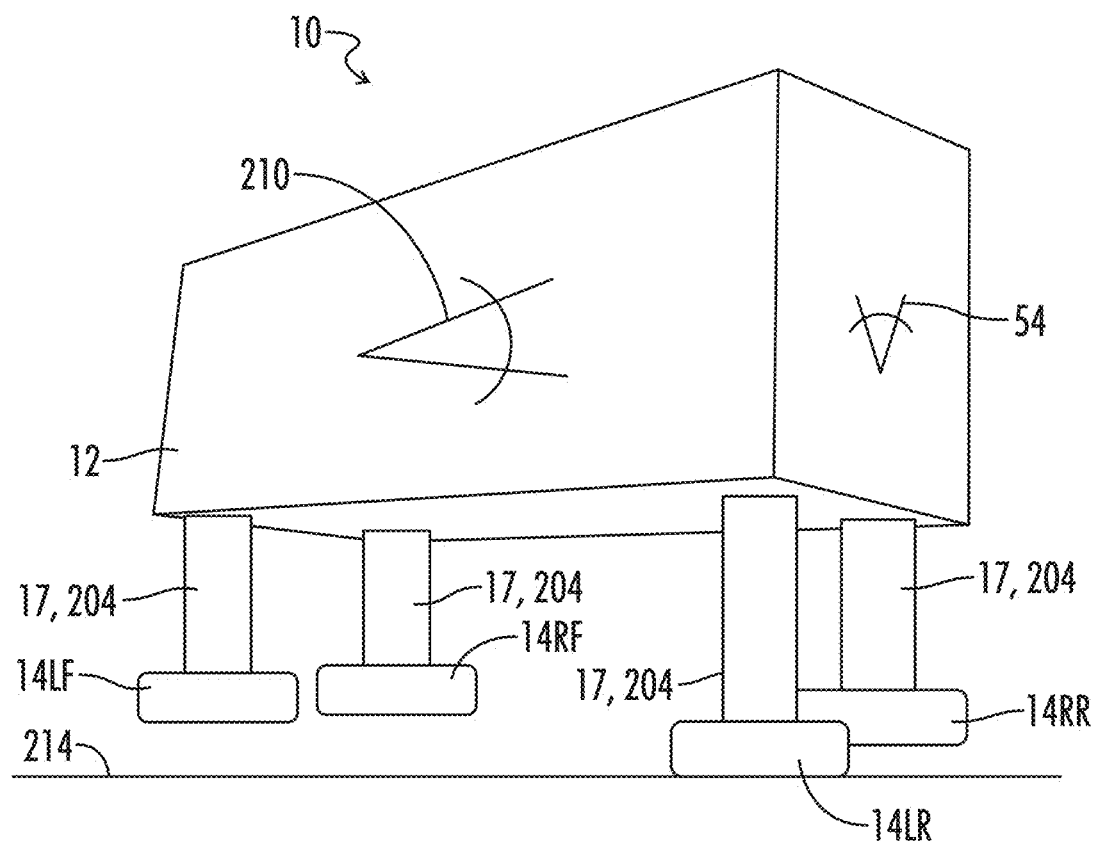
FIGS. 21A-21C are schematic representations of the method of confirming whether the current ground surface conforms to the ground surface as previously surveyed.
Figure 21B:
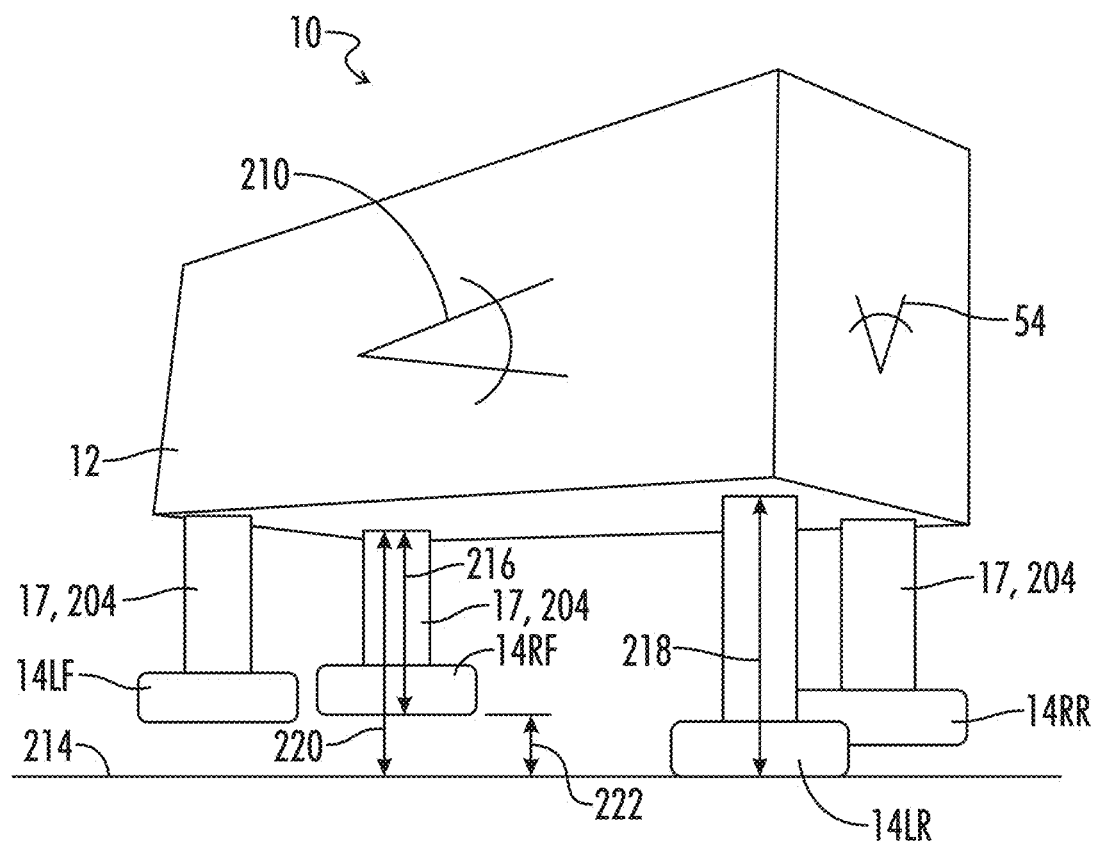
Figure 21C:
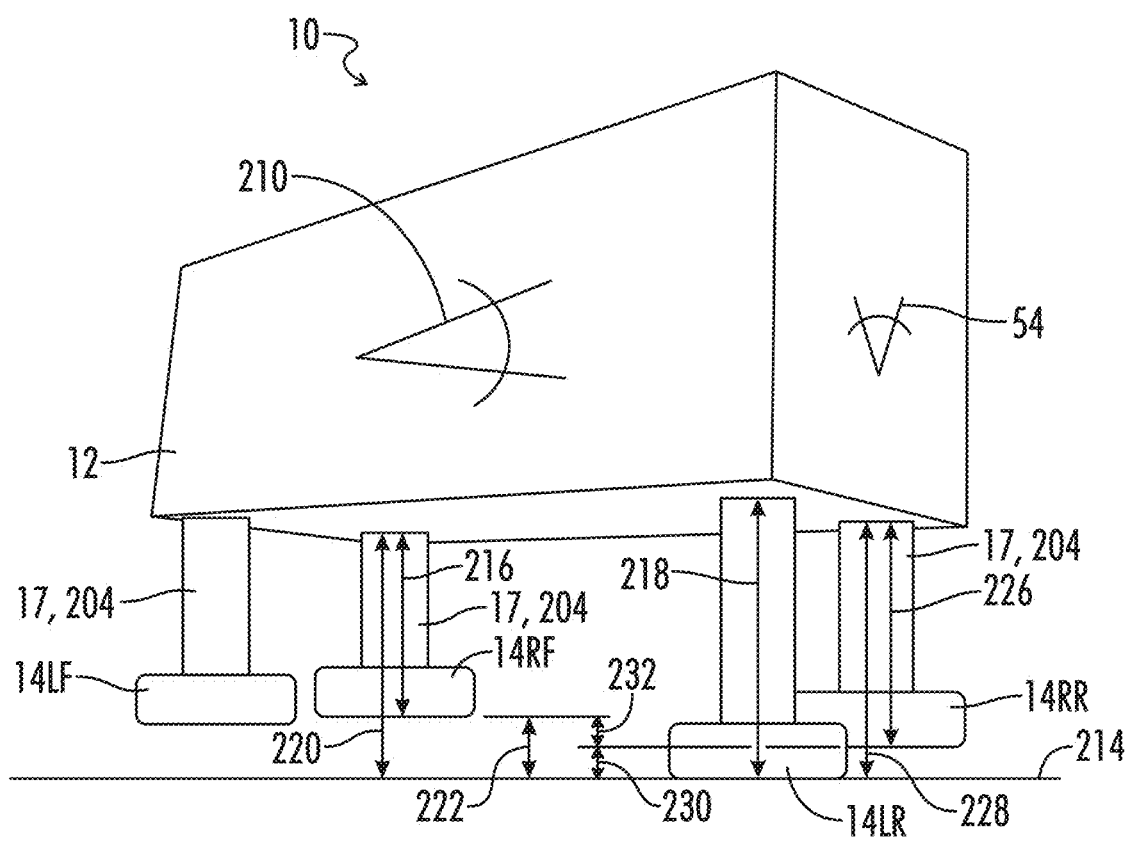

One example of such a process is schematically illustrated in FIGS. 21A-21C. As seen in FIG. 21A, the construction machine 10 includes the machine frame 12 and four ground engaging tracks 14 which support the machine frame 12 via extendable lifting columns 17. Each of the lifting columns 17 includes one of the leg extension sensors 204. A longitudinal slope sensor 210 and a cross-slope sensor 54 are mounted on the machine frame 12. The reference plane is identified as 214 and in this case is a horizontal plane perpendicular to the direction of gravity and including the point of contact of the lowest one of the tracks 14 as measured along the longitudinal axis of its lifting column 17. In the illustrated example the lowest track is the left rear track 14LR.

Using a horizontal reference plane allows the orientation of the machine frame 12 relative to the reference plane 214 to be determined using the slope sensors 210 and 54.

For this example, the pair of distance sensors will include the leg sensor 204 associated with the right front track 14RF, and the leg sensor 204 associated with the left rear track 14LR.

As seen in FIG. 21B, the leg sensors 204 associated with the right front track 14RF and the left rear track 14LR measure extension distances 216 and 218, respectively. Then based upon the measurements by the slope sensors 210 and 54 and the known dimensions of the machine frame 12 the distance 220 of the frame 12 from the horizontal reference plane 214 along the axis of the right front lifting column 17 can be calculated. Finally, by subtracting the measured distance 216 of the right front track 14RF from the calculated distance 220 to the horizontal reference plane 214, the difference 222 in elevation of the right front track 14RF and the left rear track 14LR from the horizontal reference plane 214 is determined. This difference 222 is the current relative orientation 222, relative to each other and relative to the reference plane 214 of the leg sensor 204 of the right front track 14RF and the leg sensor 204 of the left rear track 14LR. This may also be referred to as a "true vertical distance" 222, relative to each other and relative to a reference plane defined within the digital model, of a first sensor and a second sensor of a selected sensor pair. It will be appreciated that the distance 222 defining the current relative orientation between the two distance sensors in question will be the same regardless of the elevation of the selected horizontal reference plane 214.

Similarly, the current relative orientation of any other pair of the distance sensors may be determined. FIG. 21C illustrates the determination of current relative orientation for the pair of distance sensors including the leg sensor 204 associated with the right front track 14RF and the leg sensor 204 associated with the right rear track 14RR. As seen in FIG. 21C, the leg sensors 204 associated with the right front track 14RF and the right rear track 14RR measure extension distances 216 and 226, respectively. Then based upon the measurements by the slope sensors 210 and 54 and the known dimensions of the machine frame 12 the distance 220 of the frame 12 from the horizontal reference plane 214 along the axis of the right front lifting column 17 can be calculated, and the distance 228 of the frame 12 from the horizontal reference plane 214 along the axis of the right rear lifting column 17 can be calculated. By subtracting the measured distance 216 of the right front track 14RF from the calculated distance 220 to the horizontal reference plane 214, the vertical distance 222 of the right front track 14RF above the horizontal reference plane 214 is determined. And by subtracting the measured distance 226 of the right rear track 14RR from the calculated distance 228 to the horizontal reference plane, the vertical distance 230 of the right rear track 14RR above the horizontal reference plane 214 is determined. The current relative orientation of the sensors associated with the right front track 14RF and the right rear track 14RR relative to each other and relative to the reference plane 214 is the difference 232 between the distances 222 and 230. This may also be referred to as a "true vertical distance" 232, relative to each other and relative to a reference plane defined within the digital model, of a first sensor and a second sensor of a selected sensor pair. It will be appreciated that the distance 232 defining the current relative orientation between the two distance sensors in question will be the same regardless of the elevation of the selected horizontal reference plane 214. This distance 232 represents the difference in elevation relative to the reference plane 214 of the current ground surface immediately below the centreline of the right front lifting column 17 associated with track 14LF and immediately below the centreline of the right rear lifting column 17 associated with track 14RR. If the current ground surface conforms to the expected ground surface that distance 232 will be equal to the expected difference between the elevations relative to the reference plane 214 of the current ground surface immediately below the centreline of the right front lifting column 17 associated with track 14LF and immediately below the centreline of the right rear lifting column 17 associated with track 14RR.

It will be appreciated that the choice of the reference plane 214 may vary. What is important is that an orientation of the machine frame 12 is known relative to the reference plane 214, and that a distance of at least one point on the machine frame is measurable relative to the reference plane. If a horizontal reference plane is selected, then the orientation of the machine frame 12 relative to the reference plane may be determined using gravity based slope sensors 210 and 54. It is convenient to select the elevation of the lowest extended track 14 as the elevation of the reference plane 214, as was done in FIGS. 21A-21C, but the elevation of any one of the tracks 14 could have been chosen as the elevation of the reference plane; that might just lead to some of the distances being negative numbers.

But other types of reference planes could be defined. For example, a reference plane might be defined within the external reference system using a laser plane device, and then the orientation of the machine frame and the distances of the tracks from the reference plane could be determined using sensors for detecting the position and orientation of various points on the machine frame relative to the laser plane.

The technique described above may be described as a distance measuring method wherein the determining with the controller 56 of the current relative orientation includes determining a difference 232 between a current distance 222 between the first sensor 14RF and the reference plane 214 detected by the first sensor 14RF of the at least one sensor pair and a current distance 230 between the second sensor 14RR and the reference plane 214 detected by the second sensor 14RR of the at least one sensor pair. It will be understood that references to one of the tracks 14RF or 14RR as a "sensor" is referring to the track 14, lifting column 17 and leg sensor 204 which collectively function as a distance sensor to detect a distance 216, 226 from the machine frame 12 to the ground surface, and thus by subtraction from the calculated distance 220, 228 to the reference plane the distances 222 and 230 from the respective track to the reference plane 214 are determined.

Figure 22:
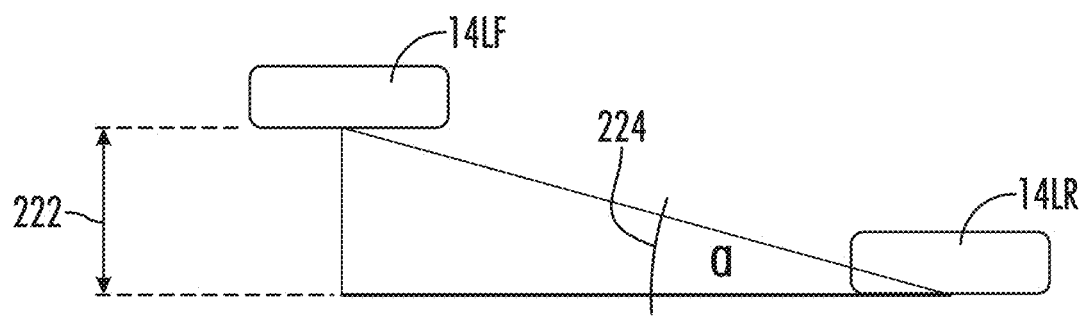
FIG. 22 is a schematic illustration of a determination of current relative orientation of a pair of sensors expressed as an angle between the sensor elements relative to a reference plane.

The current relative orientation, relative to each other and relative to a reference plane defined within the digital model, of a first sensor and a second sensor of at least one sensor pair of the plurality of distance sensors may also be expressed in terms of a "true angle" relative to each other and relative to the reference plane. This is illustrated in FIG. 22. Given the true vertical distance 222 discussed above, and the known horizontal distance between the sensors in question, a "true angle" 224 may be calculated. In this angle measuring method, the determining with the controller 56 of the current relative orientation includes determining a current angle 224 relative to the reference plane 214 of a line between a ground contact point of the first sensor and a ground contact point of the second sensor of the at least one sensor pair.

Determining Expected Relative Orientation:

The expected relative orientation between the two distance sensors of any selected pair of distance sensors is determined from the digital model. This can be achieved by first receiving position data with the position data determination component 44, 46 to define the current position of a reference point on the construction machine 10 in the reference system external to the construction machine. For example, the position of the construction machine may be determined using GPS sensors. Based on that position data the controller 56 may determine a current x, y position in the reference system external to the construction machine of each of the distance sensors being compared. Then based upon the selected digital model, the controller may calculate the expected difference between the vertical distances measured by the two distance sensors relative to each other and relative to the reference plane 214.

The digital model used may be any of the digital models previously described, or others. The digital model may be the Working Depth Model as described above including the working depth data set and the design surface data set. The digital model may be the Working Elevation Model as described above including the actual ground surface data set and the design surface data set. Alternatively, the digital model may include the actual ground surface data set and the working depth data set.

The expected relative orientation can then be compared to the current relative orientation. If the current relative orientation for the selected sensor pair is equal to the expected relative orientation for that sensor pair, that is one confirmation that the current ground surface on which the machine is located conforms to the ground surface that was initially surveyed.

If the current relative orientation for the selected sensor pair is not equal to the expected relative orientation for that sensor pair, that is an indication that either the current ground surface is not in conformance with the originally surveyed ground surface, or there is a defect in one of the distance sensors. If only one pair of sensors has been compared, then all that is known is that either the ground is not in conformity or there is a faulty sensor; we do not know which is the case. In such an event, the controller 56 may provide corrective action responsive to the lack of conformity. Such corrective action may be in the form of visual or audible indicia observable by the operator at the control panel 38. But if multiple sensor pairs are checked, the system can provide further information and in some cases compensate the underlying problem.

Preferably such a comparison is performed for a plurality of selected sensor pairs of the available distance sensors. The more comparisons that are successfully performed confirming that the current relative orientation for the selected sensor pair is equal to the expected relative orientation for that sensor pair, the higher the level of confidence is that the current ground surface on which the machine is located conforms to the ground surface that was initially surveyed.

For example, assume that a plausibility check is made for the following sensor pairs:

1) Left side plate sensor 50+right side plate sensor 52;
2) Left side plate sensor 50+scraper blade sensor 206;
3) Right side plate sensor 52+scraper blade sensor 206.

If pairs 1) and 3) are detected to be erroneous pairs (the current relative orientation for the selected sensor pair is not equal to the expected relative orientation) and pair 2) is considered a plausible sensor pair (the current relative orientation for the selected sensor pair is equal to the expected relative orientation), then the reading of the right side sensor plate sensor 52 is most probably the source of the error.

The more sensor pairs that are checked, the more reliable the detection of the source of the error is. In the above example, if additionally left and right side plate sensors 50, 52 are plausibility checked against the track extension sensors 204 in the lifting columns 17 and/or against the leading sensors 200, 202 in front of the milling drum 22, and only the combinations involving the right side plate sensor 52 are detected to be erroneous, then it becomes more and more obvious that it is the right side plate sensor 52 causing the problem.

The controller 48 may also provide corrective action in the form of automated responses performed by the controller 48. The controller 48 may initiate an operational shutdown procedure. The controller 48 may update the digital model and continue the working operation. If the controller 48 determines that the lack of conformity of the current relative orientation to the expected relative orientation of any of the sensor pairs is due to a sensor malfunction of a distance sensor being used for control of a working depth of the working implement 22, then the controller 48 may automatically switch control of the working depth from the malfunctioning sensor to a different sensor.

Confirmation that the current relative orientation for the selected sensor pair is equal to the expected relative orientation may be performed at various stages of an earth working operation. For example, a "start up confirmation" may be performed by comparing the current relative orientation to the expected relative orientation of a selected sensor pair before beginning working of the ground surface 16 with the working implement 22 to determine whether the current relative orientation of the at least one sensor pair is consistent with coordinate data describing the ground surface 16 as surveyed at a prior time in the reference system external to the construction machine 10.

Figure 2:
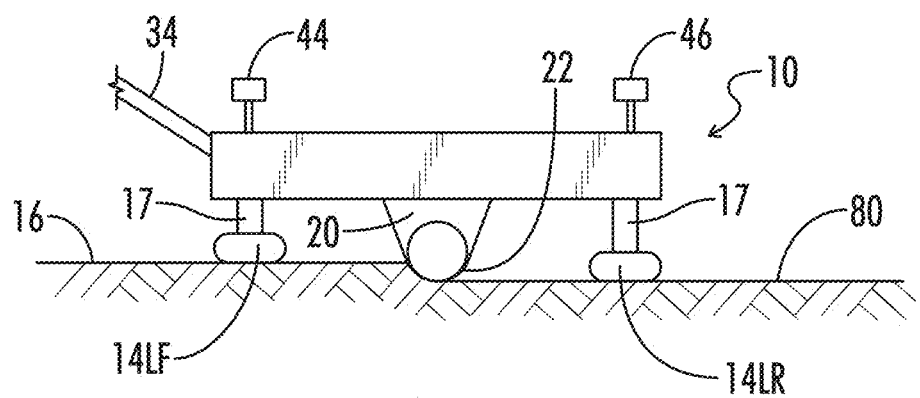
FIG. 2 is a schematic left side elevation view of the road milling machine of FIG. 1 performing a milling operation, wherein the rear tracks of the road milling machine are running in the milled track.

Confirmation may also be performed during the working of the ground surface 16 with the working implement 22 to determine whether the current relative orientation of the at least one sensor pair is consistent with coordinate data describing an expected modified ground surface in the reference system external to the construction machine 10. The "expected modified ground surface" may for example be the milled surface 80 behind the milling machine 10 as shown in FIG. 2. The "expected modified ground surface" would be defined in the digital model as the digital model of the original surveyed ground surface 16 as updated to reflect the expected changes made by the working implement 22. 22. Plausibility checking during working operation may be used for: 1) detecting obstacles; 2) detecting erroneous sensors; and/or 3) automated sensor switching.

Identifying Faulty Sensors:

As noted above, the comparison of multiple selected sensor pairs can provide further useful information such as helping to identify faulty sensors. For example, if one of the comparisons indicates a lack of conformity of the current relative orientation to the expected relative orientation, that lack of conformity may be due to a faulty sensor reading or it may be due to an actual lack of conformity of the current ground surface to the ground surface that was initially surveyed.

A determination as to whether a sensor is faulty may be made by observing the sensor readings over time. If one sensor is consistently involved with non-conforming current relative orientations of sensor pairs over a period of time, this is an indication that the sensor may be faulty. On the other hand, if the sensor appears to return to normal after a short period of time, this will indicate that the sensor was in fact detecting some unexpected obstacle on the ground surface. Also, if a following sensor (e.g. right rear track) duplicates the same apparent "error" as its leading sensor (e.g. right front track), this is an indication that both sensors are in fact detecting the same obstacle on the ground surface.

If a defective sensor is detected the operator of the machine may be notified so that corrective action may be taken.

Also, if the comparing determines that the lack of conformity of the current relative orientation to the expected relative orientation of any of the sensor pairs is due to a sensor malfunction of a distance sensor being used for control of a working depth of the working implement 22, then the controller 48 may automatically switch control of the working depth from the malfunctioning sensor to a different sensor.

On the other hand, if multiple comparisons all indicate that there is a lack of conformity of the current ground surface to the ground surface that was initially surveyed, that difference in the elevation of the ground surface may be recorded and the digital model may be updated.

If all the checked sensor pairs are considered plausible sensor pairs there is no need for a machine reaction at all.

If one sensor can be identified as the cause for the erroneous sensor pairs and it is currently not being used for milling depth control, the controller 48 may automatically send an alert to the operator that this one of the sensors is currently unusable.

If one sensor can be identified as the cause for the erroneous sensor pairs and it is currently being used for milling depth control, the controller 48 may automatically: 1) switch to another sensor if the other sensor is available and usable; 2) alert the operator; and/or 3) stop the machine operation.

If one sensor can be identified as the cause for any erroneous sensor pairs and if that one sensor can be replaced by a different sensor, then there is no need to identify the underlying problem. No matter if the digital model is correct, or if the sensor is broken, by disabling the sensor for machine control the problem is circumvented. When there are no more erroneous sensor pairs detected, the controller 56 can switch back to the originally used sensors for working depth control.

If one sensor only temporarily causes erroneous sensor pairs this may be used for obstacle detection. For example, the one erroneous sensor may have engaged a dirt pile on the ground surface. After passing the dirt pile there should be no more erroneous sensor pairs and the system can switch back to the originally used sensors. The position of the "obstacle" could then be stored in the memory 60 of the controller 48.

If one sensor permanently causes erroneous sensor pairs, then the operator can be alerted to the fact that there is probably a faulty sensor.

If the system is not able to unambiguously determine the source of erroneous sensor pairs or if multiple sensors are causing erroneous readings, the operator may be alerted by the controller 48.

Alternative Reference Systems:

As previously noted, other reference systems than a satellite based system may be used. In the embodiment described above the at least one position data determination component includes at least two position data determination components 44 and 46 in the form of Global Navigation Satellite System sensors, for example GPS sensors. In another embodiment the position data determination components 44 and 46 may be reflectors configured for use with a laser based Robotic Total Station. If such a laser-based system is used then the reference plane 214 may for example be defined as a plane swept by a rotating laser source. In such a system the reference plane does not need to be a horizontal plane.

Confirmation of X, Y Location:

A further optional use of the system disclosed herein is as an aid in confirming an x, y location and/or orientation of a construction machine within the reference system external to the construction machine.

As will be understood by those skilled in the art, a GPS sensor system sometimes encounters operational difficulties, and the GPS sensor signals may be temporarily lost or become unreliable. For example, the GPS signals may be blocked by obstacles such as a building or a mountain or other geological structure. Or a GPS sensor may malfunction. In such instances various back-up techniques are used to estimate the current x, y position of the construction machine after the GPS signal is lost, in order to allow continued operation of the construction machine until the preferred GPS guidance can be reestablished. One such technique is "dead reckoning" which uses the last known x, y position plus speed and direction information to estimate a current x, y position.

The present system provides a further technique for determining a current x, y position. If it is assumed that the current ground surface encountered by the construction machine is identical to the actual ground surface as surveyed at the prior time and as described by the actual ground surface data set, then the current relative orientations of the various sensor pairs discussed above may be compared to the expected relative orientations for all of the possible x, y positions in the digital model to determine one or more possible x, y locations of the construction machine that could result in the current relative orientations of the sensor pairs. The more sensor pairs that are available for comparison, the more likely that a single possible x, y location and orientation of the construction machine can be determined. If multiple possible positions are identified, the data can be prioritized to determine a most likely current x, y location. For example, using elapsed time and advance speed data from the last known x, y position of construction machine, the most likely possible current x, y position may be selected from the possible positions providing the observed current relative orientation data.

Thus, it is seen that the apparatus and methods of the embodiments disclosed herein readily achieve the ends and advantages mentioned as well as those inherent therein. While certain preferred embodiments have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A method of operating a construction machine including a machine frame, a working implement supported from the machine frame, a controller, and a plurality of distance sensors supported directly or indirectly from the machine frame, each respective distance sensor being configured to detect a distance between the machine frame and a ground surface, the method comprising:

providing to the controller a digital model defined within a reference system external to the construction machine, the digital model being configured to guide the construction machine as the construction machine works the ground surface to create a design surface;

determining with the controller a current relative orientation, relative to each other and relative to a reference plane defined within the digital model, of a first sensor and a second sensor of at least one sensor pair of the plurality of distance sensors;

determining with the controller based at least in part on the digital model an expected relative orientation, relative to each other and relative to the reference plane, of the first sensor and the second sensor of the at least one sensor pair; and comparing with the controller the current relative orientation to the expected relative orientation of the at least one sensor pair to confirm whether the current relative orientation conforms to the expected relative orientation.

2. The method of claim 1, wherein:

the construction machine further includes at least one position data determination component operable to determine position data to define a current position of a reference point on the construction machine in the reference system external to the construction machine; and the method further comprises:

receiving the position data with the controller; and determining with the controller a current x, y position in the reference system external to the construction machine of each of the distance sensors.

3. The method of claim 1, wherein:

the digital model includes a working depth data set including x and y coordinate data in the reference system external to the construction machine, and including desired working depth data corresponding to the x and y coordinate data; and the digital model further includes a design surface data set defining the design surface to be created, the design surface data set including x, y and z coordinate data of the design surface in the reference system external to the construction machine.

4. The method of claim 1, wherein:

the digital model includes an actual ground surface data set including x, y and z coordinate data describing the actual ground surface as surveyed at a prior time in the reference system external to the construction machine; and the digital model further includes a design surface data set defining the design surface to be created, the design surface data set including x, y and z coordinate data of the design surface in the reference system external to the construction machine.

5. The method of claim 1, wherein:

the digital model includes an actual ground surface data set including x, y and z coordinate data describing the actual ground surface as surveyed at a prior time in the reference system external to the construction machine; and the digital model further includes a working depth data set including x and y coordinate data in the reference system external to the construction machine, and including desired working depth data corresponding to the x and y coordinate data.

6. The method of claim 1, wherein:
the reference plane within the digital model is a horizontal reference plane defined as a reference plane perpendicular to a direction of gravity in the reference system external to the construction machine.

7. The method of claim 6, further comprising:
detecting with at least one slope sensor a slope of the machine frame relative to the direction of gravity and thereby relative to the reference plane.

8. The method of claim 6, further comprising:
detecting with a longitudinal slope sensor a longitudinal slope of the machine frame relative to the direction of gravity; and
detecting with a cross-slope sensor a cross-slope of the machine frame relative to the direction of gravity, the cross-slope being perpendicular to the longitudinal slope.

9. The method of claim 1, wherein:
the comparing is performed before beginning working of the ground surface with the working implement to determine whether the current relative orientation of the at least one sensor pair is consistent with the digital model.

10. The method of claim 1, wherein:
the comparing is performed during working of the ground surface with the working implement to determine whether the current relative orientation of the at least one sensor pair is consistent with coordinate data describing an expected ground surface in the reference system external to the construction machine.

11. The method of claim 1, wherein:
in the determining of the current relative orientation and of the expected relative orientation of the at least one sensor pair, the at least one sensor pair includes a plurality of sensor pairs.

12. The method of claim 11, wherein:
the comparing includes determining whether a lack of conformity of the current relative orientation to the expected relative orientation of any of the sensor pairs is due to a change in the ground surface subsequent to preparation of the digital model or due to a sensor malfunction.

13. The method of claim 12, wherein:
the comparing includes identifying a malfunctioning sensor as a sensor present in multiple sensor pairs lacking conformity of the current relative orientation to the expected relative orientation for the respective sensor pair over a period of time.

14. The method of claim 12, further comprising:
if the comparing determines that the lack of conformity of the current relative orientation to the expected relative orientation of any of the sensor pairs is due to a change in the ground surface subsequent to preparation of the digital model, then updating the digital model to reflect the change.

15. The method of claim 12, further comprising:
if the comparing determines that the lack of conformity of the current relative orientation to the expected relative orientation of any of the sensor pairs is due to a sensor malfunction of a distance sensor being used for control of a working depth of the working implement, then automatically switching control of the working depth from the malfunctioning sensor to a different sensor.

16. The method of claim 1, wherein:
the determining with the controller of the current relative orientation includes determining a difference between a current distance between the first sensor and the reference plane detected by the first sensor of the at least one sensor pair and a current distance between the second sensor and the reference plane detected by the second sensor of the at least one sensor pair.

17. The method of claim 1, wherein:
the determining with the controller of the current relative orientation includes determining a current angle relative to the reference plane of a line between a ground contact point of the first sensor and a ground contact point of the second sensor of the at least one sensor pair.

18. A construction machine, comprising:
a machine frame;
a working implement supported from the machine frame for working a ground surface as the machine moves across the ground surface during a working operation;
a plurality of distance sensors supported directly or indirectly from the machine frame, each respective distance sensor being configured to detect a distance between the machine frame and the ground surface;
at least one slope sensor configured to detect a slope of the machine frame relative to a direction of gravity;
at least one position data determination component operable to determine position data to define a current position of a reference point on the construction machine in a reference system external to the construction machine; and
a controller associated with a memory, the memory having stored therein a digital model defined within the reference system external to the construction machine, the controller being operable to receive the position data from the at least one position data determination component, wherein the controller is configured to:
determine a current x, y position in the reference system external to the construction machine of each of the distance sensors;
determine a current relative orientation, relative to each other and relative to a reference plane defined within the digital model, of a first sensor and a second sensor of at least one sensor pair of the plurality of distance sensors;
determine based at least in part on the digital model an expected relative orientation, relative to each other and relative to the reference plane, of the first sensor and the second sensor of the at least one sensor pair;
compare the current relative orientation to the expected relative orientation of the at least one sensor pair to confirm whether the current relative orientation conforms to the expected relative orientation; and
in an event of a lack of conformity of the current relative orientation to the expected relative orientation of any of the sensor pairs, providing corrective action responsive to the lack of conformity.

19. The construction machine of claim 18, wherein:
the digital model includes a working depth data set including x and y coordinate data in the reference system external to the construction machine, and including desired working depth data corresponding to the x and y coordinate data; and
the digital model further includes a design surface data set defining a design surface to be created, the design surface data set including x, y and z coordinate data of the design surface in the reference system external to the construction machine.

20. The construction machine of claim 18, wherein:
the digital model includes an actual ground surface data set including x, y and z coordinate data describing the actual ground surface as surveyed at a prior time in the reference system external to the construction machine; and the digital terrain model further includes a design surface data set defining a design surface to be created, the design surface data set including x, y and z coordinate data of the design surface in the reference system external to the construction machine.

21. The construction machine of claim 18, wherein:

the digital model includes an actual ground surface data set including x, y and z coordinate data describing the actual ground surface as surveyed at a prior time in the reference system external to the construction machine; and the digital model further includes a working depth data set including x and y coordinate data in the reference system external to the construction machine, and including desired working depth data corresponding to the x and y coordinate data.

22. The construction machine of claim 18, wherein:

the reference plane within the digital model is a horizontal reference plane defined as a reference plane perpendicular to a direction of gravity in the reference system external to the construction machine.

23. The construction machine of claim 18, wherein:

the at least one slope sensor includes a longitudinal slope sensor configured to detect a longitudinal slope of the machine frame relative to the direction of gravity, and a cross-slope sensor configured to detect a cross-slope of the machine frame relative to the direction of gravity, the cross-slope being perpendicular to the longitudinal slope.

24. The construction machine of claim 18, further comprising:

a plurality of tracked ground engaging units supporting the machine frame from the ground surface;

wherein the at least one slope sensor includes a track angle sensor configured to detect a tilt angle relative to the machine frame of at least one of the tracked ground engaging units.

* * * * *